(12) United States Patent
Malofsky et al.

(10) Patent No.: US 12,122,858 B2
(45) Date of Patent: Oct. 22, 2024

(54) THIN-FILM CATECHOL CONTAINING MATERIALS

(71) Applicant: Mussel Polymers, Inc., Bethlehem, PA (US)

(72) Inventors: Adam Gregg Malofsky, Loveland, OH (US); Bernard Miles Malofsky, Bloomfield, CT (US); Jason Andrew Stieg, Lafayette Hill, PA (US); David Schmidt, Chester, NJ (US)

(73) Assignee: Mussel Polymers, Inc, Bethlehem, PA (US)

( * ) Notice: Subject to any disclaimer, the term of this patent is extended or adjusted under 35 U.S.C. 154(b) by 290 days.

(21) Appl. No.: 17/485,950

(22) Filed: Sep. 27, 2021

(65) Prior Publication Data
US 2022/0169759 A1 Jun. 2, 2022

Related U.S. Application Data

(60) Provisional application No. 63/083,894, filed on Sep. 26, 2020.

(51) Int. Cl.
| | | |
|---|---|---|
| *C08F 12/24* | (2006.01) | |
| *B05D 7/14* | (2006.01) | |
| *C08G 18/62* | (2006.01) | |
| *C08G 59/68* | (2006.01) | |
| *C08J 7/04* | (2020.01) | |
| *C08J 7/043* | (2020.01) | |
| *C09D 125/18* | (2006.01) | |

(52) U.S. Cl.
CPC ............... *C08F 12/24* (2013.01); *B05D 7/14* (2013.01); *C08G 18/62* (2013.01); *C08G 59/686* (2013.01); *C08J 7/042* (2013.01); *C08J 7/043* (2020.01); *C09D 125/18* (2013.01); *B05D 2202/15* (2013.01); *B05D 2202/25* (2013.01)

(58) Field of Classification Search
CPC . C08F 12/24; C08J 7/043; C08J 7/042; B05D 7/14; B05D 2202/15; B05D 2202/25; C08G 18/62; C08G 59/686; C09D 125/18
USPC ........................................................ 526/313
See application file for complete search history.

(56) References Cited

FOREIGN PATENT DOCUMENTS

| | | | | |
|---|---|---|---|---|
| CN | 110819287 A | * | 2/2020 | ......... C08G 18/3215 |
| EP | 3500602 A2 | | 6/2019 | |
| WO | WO-2018089078 A2 | * | 5/2018 | ............ C08F 212/08 |

OTHER PUBLICATIONS

CN 110819287 A—machine translation (Year: 2020).*
New Heaven Reef Conservation Program, "Introduction to Coral Restoration", Mar. 17, 2020 (Year: 2020).*
Baby Monisha et al: "Bioinspired surface activators for wet/dry environments through greener epoxy-catechol amine chemistry", Applied Surface Science, Elsevier, Amsterdam, NL, vol. 505, Oct. 31, 2019 (Oct. 31, 2019), XP085991332, ISSN: 0169-4332, DOI: 10.1016/J.APSUSC.2019.144414 [retrieved on Oct. 31, 2019] the whole document.

* cited by examiner

*Primary Examiner* — Ling Siu Cho
*Assistant Examiner* — Ronald Grinsted
(74) *Attorney, Agent, or Firm* — BakerHostetler

(57) ABSTRACT

The disclosure relates to thin layers comprising a catechol containing polymer or oligomer, as well as methods of making and using the thin layers comprising the catechol containing polymer or oligomer. The layers demonstrate improved adhesion between two materials without substantial modification of the adhesive matrix.

28 Claims, 20 Drawing Sheets

A

B

THIN-FILM CATECHOL CONTAINING MATERIALS

CROSS REFERENCE TO RELATED APPLICATIONS

This application claims the benefit of U.S. Provisional Application No. 63/083,894, filed Sep. 26, 2020, the entirety of which is incorporated by reference herein.

TECHNICAL FIELD

The present disclosure relates to thin layers comprising a catechol containing polymer or oligomer, which demonstrate improved adhesion between two materials without substantial modification of the adhesive matrix. The present disclosure also relates to methods of making and using the thin layers comprising a catechol containing polymer or oligomer.

BACKGROUND

The industrially economic and facile use of catechol chemistry to improve adhesion has been elusive, especially the long-term durable adhesion of one matrix to another, particularly under aqueous, moist and humid conditions.

Current art mostly describes modifying entire matrices for use in any formulation, method and application regarding the use of catechol chemistry to improve adhesion, particularly adhesion in wet environments. Modifying an entire matrix with new and often highly variable components dramatically alters in virtually all cases the matrix physical properties. Accordingly, developing entirely new matrices versus simply modifying the method of improving adhesion otherwise and staying with unmodified matrices is time consuming, expensive, complex and often requiring of a significantly more rigorous approval process by all governing or approving bodies required. Indeed, it is possible such a modification so significantly changes physical properties that no workable system may be ultimately achieved, especially within a user's desired time frame for successful commercial activity. It would be of great use to eliminate these limitations without compromising the adhesive. There is also extensive work in developing thin layers with highly specific architectures, application methods and complex chemistries using catechol chemistry to improve adhesion. Most typically, these involve dopamine containing polymers and or polymers containing both a catechol and another reactive species, particularly an amine or an acrylate, less so an epoxy or other reactive species that typically require again complex preparations and application methods. Of particular consequence, those polymers containing both amine and catechol require careful pH control, water as a solvent and thus long and complex preparations again. Even further, the amines have a tendency to react with the quinones that result from the oxidation of the catechols leading to crosslinking that can interfere with subsequent physical and chemical interactions. Furthermore, many of these preparations then require the use of heating to finalize a given structure. Indeed, there is no practical way to heat a substrate underwater at any volume or speed. It would be of great utility then to not have the complex chemistry, the complex processes for film and also matrix preparation, the requirement of heat, the use of water, the containing of self-reactive groups on the same structure save the catechol itself and the cumulative capital and operating costs for developing bonds under water and or resistive to water exposure both before, during and after bonding, such as in humid and simply wet conditions.

Accordingly, a need exists for the successful use of catechol containing materials to improve adhesion, specifically to improve adhesion dry, in humid, wet and underwater conditions, to utilize catechol chemistry simply, effectively and efficiently, particularly simply at low costs and repetitively in volume where products can be stored, handled and otherwise utilized as needed.

SUMMARY OF THE INVENTION

The present disclosure is directed to a polymeric layer comprising a catechol containing polymer or oligomer, wherein said catechol presents as a catechol and/or as a semi-quinone and/or as a quinone without the presence of a primary amine or a secondary amine; and wherein the polymeric layer optionally comprises at least one of: a) a reactive species separate from the catechol containing polymer or oligomer; and b) a catalyst, co-catalyst or an accelerator. The present disclosure is also directed to methods of making and using the polymeric layer comprising the catechol containing polymer or oligomer. In an aspect, the catechol containing polymer or oligomer is poly-catechol styrene (PCS).

BRIEF DESCRIPTION OF THE DRAWINGS

FIG. 1A depicts an embodiment that includes a second layer of the inventive formulation. FIG. 1B depicts an embodiment that does not include a second layer of the inventive formulation.

DETAILED DESCRIPTION OF ILLUSTRATIVE EMBODIMENTS

Figure 1:
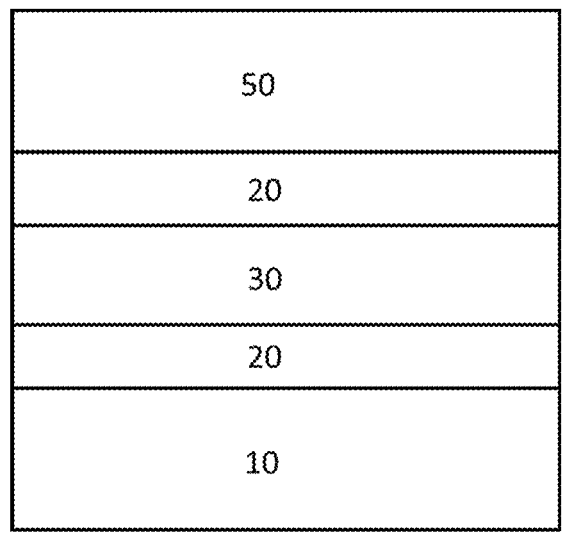
FIG. 1 depicts a schematic of the layers and layered articles described herein.
Figure 1:
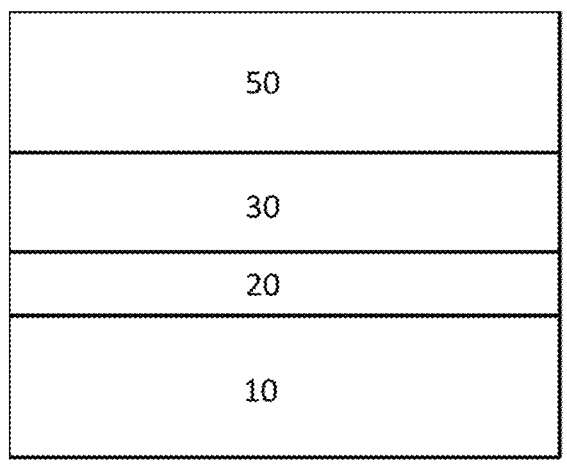

Unless otherwise defined, all technical and scientific terms used herein have the same meaning as commonly understood by one of ordinary skill in the art to which this disclosure pertains. The terminology used in the description is for describing particular embodiments only and is not intended to be limiting of the disclosure.

The following terms are used to describe the present disclosure. In instances where a term is not specifically defined herein, that term is given an art-recognized meaning by those of ordinary skill applying that term in context to its use in describing the present disclosure.

In the present disclosure the singular forms "a", "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about" or "substantially" it will be understood that the particular value forms another embodiment. In general, use of the term "about" or "substantially" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about" or "substantially". In other cases, the gradations used in a series of values may be used to determine the intended range available to the term "about" or "substantially" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the disclosure which are, for clarity, described herein in the context of separate embodiments, may also be provided in combination in a single embodiment. That is, unless obviously incompatible or excluded, each individual embodiment is deemed to be combinable with any other embodiments and such a combination is considered to be another embodiment. Conversely, various features of the disclosure that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements or use of a "negative" limitation. Finally, while an embodiment may be described as part of a series of steps or part of a more general structure, each said step may also be considered an independent embodiment in itself.

In an aspect, the disclosure is directed to a polymeric layer comprising a catechol containing polymer or oligomer, wherein said catechol presents as a catechol and/or as a semi-quinone and/or as a quinone without the presence of a primary amine or a secondary amine; and wherein the polymeric layer optionally comprises at least one of: a) a reactive species separate from the catechol containing polymer or oligomer; and b) a catalyst, co-catalyst or an accelerator.

In some embodiments, the polymeric layer comprises the catechol containing polymer or oligomer, wherein said catechol presents as a catechol and/or as a semi-quinone and/or as a quinone without the presence of a primary amine or a secondary amine.

In some embodiments, the polymeric layer comprises the catechol containing polymer or oligomer, wherein said catechol presents as a catechol and/or as a semi-quinone and/or as a quinone without the presence of a primary amine or a secondary amine; and also comprises the reactive species separate from the catechol containing polymer or oligomer.

In some embodiments, the polymeric layer comprises the catechol containing polymer or oligomer, wherein said catechol presents as a catechol and/or as a semi-quinone and/or as a quinone without the presence of a primary amine or a secondary amine. In some embodiments, the polymeric layer comprises the catechol containing polymer or oligomer, wherein said catechol presents as a catechol and/or as a semi-quinone and/or as a quinone without the presence of a primary amine or a secondary amine; and also comprises the catalyst, co-catalyst or an accelerator.

In some embodiments, the polymeric layer comprises the catechol containing polymer or oligomer, wherein said catechol presents as a catechol and/or as a semi-quinone and/or as a quinone without the presence of a primary amine or a secondary amine. In some embodiments, the polymeric layer comprises the catechol containing polymer or oligomer, wherein said catechol presents as a catechol and/or as a semi-quinone and/or as a quinone without the presence of a primary amine or a secondary amine; and also comprises both the reactive species separate from the catechol containing polymer or oligomer and the catalyst, co-catalyst or an accelerator.

FIG. 1 depicts a general schematic of the polymeric layer 20 comprising the catechol containing polymer or oligomer and a layered article 100 comprising the polymer layer described herein. The layered article 100 may comprise a substrate 10 which the polymeric layer 20 is disposed on and in contact with. The layered article 100 may also comprise a polymer matrix 30 disposed on the polymeric layer 20 and in contact with the polymeric layer 20. The layered article 100 may also comprise a second polymeric layer comprising the catechol containing polymer or oligomer 40 disposed on and in contact with polymer matrix 30. The layered article 100 may also comprise a second substrate 50 disposed on and in contact with the second polymeric layer 40.

In some embodiments, the catechol containing polymer or oligomer in the polymeric layer 20 is oligomeric. In some embodiments, the catechol containing polymer or oligomer in the polymeric layer 20 is polymeric.

In an aspect, the polymeric layer 20 comprises the reactive species separate from the catechol containing polymer or oligomer. In an aspect, the reactive species is a urethane component, an epoxy resin, an acrylate monomer or oligomer, a methacrylate monomer or oligomer, a silane, or a combination thereof.

In some embodiments, the reactive species separate from the catechol containing polymer or oligomer is a urethane component. In some embodiments, the urethane component is a polyol or an organic compound containing multiple hydroxyl groups; and wherein the urethane is linear or branched.

In some embodiments, the urethane component is 1,6-hexanediol, glycerol, Stepanpol PDC-279® or polycaprolactone triol. In some embodiments, the urethane component is 1,6-hexanediol. In some embodiments, the urethane component is glycerol. In some embodiments, the urethane component is Stepanpol PDC-279®. In some embodiments, the urethane component is polycaprolactone triol.

In an aspect, the reactive species separate from the catechol containing polymer or oligomer is an epoxy resin. In some embodiments, the epoxy resin is an epoxy monomer, an epoxy oligomer, a polyepoxide or combinations thereof and wherein the epoxy is linear or branched. In some embodiments, the epoxy resin is an epoxy monomer. In some embodiments, the epoxy resin is an epoxy oligomer. In some embodiments, the epoxy resin is a polyepoxide.

In some embodiments, the epoxy resin is bisphenol A diglycidyl ether, Bisphenol A epoxy resin, bis(4-glycidyloxyphenyl)methane, bisphenol E diglycidyl ether (DGEBE), 2,2'-[1,1-Ethanediylbis(4,1-phenyleneoxymethylene)]dioxirane, bisphenol F diglycidyl ether (DGEBF), poly(bisphenol A-co-epichlorohydrin) or combinations thereof.

In some embodiments, the epoxy resin is bisphenol A diglycidyl. In some embodiments, the epoxy resin is bisphenol A epoxy resin. In some embodiments, the epoxy is bis(4-glycidyloxyphenyl)methane. In some embodiments, the epoxy resin is bisphenol E diglycidyl ether (DGEBE). In some embodiments, the epoxy resin is 2,2'[1,1-ethanediylbis(4,1-phenyleneoxymethylene)]dioxirane. In some embodiments, the epoxy resin is bisphenol F diglycidyl ether (DGEBF). In some embodiments, the epoxy resin is poly(bisphenol A-co-epichlorohydrin).

In an aspect, the reactive species separate from the catechol containing polymer or oligomer is an acrylate monomer or oligomer. In some embodiments, the acrylate monomer or oligomer is an acrylate monomer comprising a vinyl group and at least one of a carboxylic acid ester and a carboxylic acid nitrile; and wherein the acrylate is linear or branched.

In some embodiments, the acrylate monomer or oligomer is ethyl acrylate, ethylene-methyl acrylate, methyl methacrylate, 2-chloroethyl vinyl ether, 2-hydroxyethyl acrylate, hydroxyethyl methacrylate, butyl acrylate, trimethylolpropane triacrylate (TMPTA) or combinations thereof.

In some embodiments, the acrylate monomer or oligomer is ethyl acrylate. In some embodiments, the acrylate monomer or oligomer is ethylene-methyl acrylate. In some embodiments, the acrylate monomer or oligomer is methyl methacrylate. In some embodiments, the acrylate monomer or oligomer is 2-chloroethyl vinyl ether. In some embodiments, the acrylate monomer or oligomer is 2-hydroxyethyl acrylate. In some embodiments, the acrylate monomer or oligomer is hydroxyethyl methacrylate. In some embodiments, the acrylate monomer or oligomer is butyl acrylate. In some embodiments, the acrylate monomer or oligomer is trimethylolpropane triacrylate (TMPTA).

In some embodiments, the reactive species separate from the catechol containing polymer or oligomer is a silane. In some embodiments, the reactive species separate from the catechol containing polymer or oligomer is a methacrylate monomer or oligomer. In some embodiments, the reactive species separate from the catechol containing polymer or oligomer is a methacrylate monomer. In some embodiments, the reactive species separate from the catechol containing polymer or oligomer is a methacrylate oligomer.

In an aspect, the polymeric layer 20 comprises the catalyst, co-catalyst or accelerator; and the catalyst, co-catalyst or accelerator is a urethane catalyst that promotes a urethane polymerization reaction, an epoxy catalyst that promotes an epoxy polymerization reaction, an acrylate catalyst that promotes an acrylate polymerization reaction, or combinations thereof.

In some embodiments, the catalyst, co-catalyst or accelerator is a urethane catalyst that promotes a urethane polymerization reaction. In some embodiments, the urethane catalyst is an aliphatic amine catalyst, an alicyclic amine catalyst, an alcohol amine catalyst, an aromatic amine catalyst, or an ether amine catalyst.

In some embodiments, the urethane catalyst is an aliphatic amine catalyst. In some embodiments, the aliphatic amine catalyst is N,N-dimethylcyclohexane, triethylenediamine, N,N,N,N-tetramethylalkylenediamine, N,N,N,N-pentamethyldiethylenetriamine, triethylamine, N,N-dimethylbenzylamine, N,N-dimethylhexadecylamine, N,N-dimethylbutylamine, or combinations thereof.

In some embodiments, the urethane catalyst is an alicyclic amine catalyst. In some embodiments, the alicyclic amine catalyst is triethylenediamine, N-ethylmorpholine, N-methylmorpholine, N.N-diethylpiperazine, N,N-bis-(α-hydroxypropyl)-2-methylpiperazine, N-hydroxypropyldimethylmorpholine, or combinations thereof.

In some embodiments, the urethane catalyst is an alcohol amine catalyst. In some embodiments, the alcohol amine catalyst is triethanolamine or N,N-demethylethanolamine.

In some embodiments, the urethane catalyst is an aromatic amine catalyst. In some embodiments, the aromatic amine catalyst is pyridine or N,N-dimethylpyridine.

In some embodiments, the urethane catalyst is an ether amine catalyst. In some embodiments, the ether amine catalyst is BDMAEE.

In some embodiments, the urethane catalyst is 1,4-diazabicyclo[2.2.2]octane, K-KAT 6212, benzyldimethylamine or combinations thereof. In some embodiments, the urethane catalyst is 1,4-diazabicyclo[2.2.2]octane. In some embodiments, the urethane catalyst is K-KAT 6212. In some embodiments, the urethane catalyst is benzyldimethylamine.

In some embodiments, the catalyst, co-catalyst or accelerator is an epoxy catalyst that promotes epoxy polymerization.

Suitable catalysts, co-catalysts or accelerators are substances which accelerate the reaction between amino groups and epoxy groups, such as acids or compounds hydrolyzable to acids. Without limitation, the suitable catalysts, co-catalysts or accelerators are organic carboxylic acids such as acetic acid, benzoic acid, salicylic acid, 2-nitrobenzoic acid, lactic acid; organic sulfonic acids such as methanesulfonic acid, p-toluenesulfonic acid or 4-dodecylbenzenesulfonic acid; sulfonic esters; other organic or inorganic acids such as phosphoric acid, or mixtures of the aforementioned acids and acid esters; nitrates such as calcium nitrate in particular; or tertiary amines such as 1,4 diazabicyclo[2.2.2]octane, benzyldimethylamine, α-methyl benzyldimethylamine, triethanolamine, dimethylaminopropylamine.

In some embodiments, the epoxy catalyst is acetic acid, benzoic acid, salicylic acid, 2-nitrobenzoic acid, lactic acid, methanesulfonic acid, p-toluenesulfonic acid, 4-dodecylbenzenesulfonic acid, sulfonic esters, phosphoric acid, calcium nitrate, 1,4-diazabicyclo-[2.2.2]octane, benzyldimethylamine, α-methyl benzyldimethylamine, triethanolamine, dimethylaminopropylamine, N,N-dimethylpiperidine, triethylenediamine, 2,4,6-tris (dimethylaminomethyl) phenol (DMP-30), benzyldimethyl-amine (BDMA), 2-(dimethylaminomethyl)phenol (DMP-10), N,N dimethylbenzylamine, (dimethylaminomethyl)phenol or combinations thereof.

In some embodiments, the epoxy catalyst is 1,4-diazabicyclo[2.2.2]octane.

In some embodiments, the catalyst, co-catalyst or accelerator is an acrylate catalyst that promotes acrylate polymerization. In some embodiments, the acrylate catalyst is an acrylic or a free-radical polymerization promoter.

In some embodiments, the acrylate catalyst is methyl 4-N,N-dimethylamino-phenylacetate (MDMAPA), N,N-dimethylaminoglutethimide (OMAG), N,N-dimethyl-p-toluidine (OMPT), N,N-di-2-Hydroxyethyl-p-toluidine (DHEPT), N,N-di-2-hydroxypropyl-p-toluidine (DHPPT), N,N-dimethyl-sym-xylidine (DMSX), N,N-Bis(3-p-tolyloxy-2-hydroxy-propyl)-m-xylidine (BTX) or combinations thereof.

In an aspect, the polymeric layer 20 has a thickness of from about 10 nanometers to about 100 microns. In some embodiments, the polymeric layer 20 has a thickness of from about 15 nanometers to about 50 microns. In some embodiments, the polymeric layer 20 has a thickness of from about 15 nanometers to about 15 microns. In some embodiments, the polymeric layer 20 has a thickness of from about 150 nanometers to less than about 15 microns. In some embodiments, the polymeric layer 20 has a thickness of from about 150 nanometers to about 1.5 microns.

In some embodiments, the polymeric layer 20 has a thickness of from about 10 nanometers to about 100 microns; or from about 10 nanometers to about 100 nanometers; or from about 100 nanometers to about 150 nanometers; or from about 150 nanometers to about 200 nanometers; or from about 200 nanometers to about 250 nanometers; or from about 250 nanometers to about 300 nanometers; or from about 300 nanometers to about 350 nanometers; or from about 350 nanometers to about 400 nanometers; or from about 400 nanometers to about 450 nanometers; or from about 450 nanometers to about 500 nanometers; or from about 500 nanometers to about 550 nanometers; or from about 550 nanometers to about 600 nanometers; or from about 600 nanometers to about 650 nanometers; or from about 650 nanometers to about 700 nanometers; or from about 700 nanometers to about 750 nanometers; or from about 750 nanometers to about 800 nanometers; or from about 800 nanometers to about 850 nanometers; or from about 850 nanometers to about 900 nanometers; or from about 900 nanometers to about 950 nanometers; or from about 950 nanometers to about 1000 nanometers.

In some embodiments, the polymeric layer 20 has a thickness of from about 1 micron to about 1.5 microns; or from about 1.5 microns to about 5 microns; or from about 5 microns to about 10 microns; or from about 10 microns to about 15 microns; or from about 15 microns to about 20 microns; or from about 20 microns to about 25 microns; or from about 25 microns to about 30 microns; or from about 30 microns to about 35 microns; or from about 35 microns to about 40 microns; or from about 40 microns to about 45 microns; or from about 45 microns to about 50 microns; or from about 50 microns to about 55 microns; or from about 55 microns to about 60 microns; or from about 60 microns to about 65 microns; or from about 65 microns to about 70 microns; or from about 70 microns to about 75 microns; or from about 75 microns to about 80 microns; or from about 80 microns to about 85 microns; or from about 85 microns to about 90 microns; or from about 90 microns to about 95 microns; or from about 95 microns to about 100 microns.

In an aspect, the catechol containing polymer or oligomer in the polymeric layer 20 comprises poly-catechol styrene (PCS).

In some embodiments, the PCS comprises from about 15% catechol to about 50% catechol. In some embodiments, the PCS comprises from about 20% catechol to about 40% catechol. In some embodiments, the PCS comprises from about 25% catechol to about 35% catechol. In some embodiments, the PCS comprises about 25% catechol. In some embodiments, the PCS comprises about 35% catechol.

In some embodiments, the PCS comprises from about 20% catechol to about 22% catechol; or from about 22% catechol to about 24% catechol; or from about 24% catechol to about 26% catechol; or from about 26% catechol to about 28% catechol; or from about 28% catechol to about 30% catechol; or from about 30% catechol to about 32% catechol; or from about 32% catechol to about 34% catechol; or from about 34% catechol to about 36% catechol; or from about 36% catechol to about 38% catechol; or from about 38% catechol to about 40% catechol.

In an aspect, the polymeric layer 20 is a continuous layer. In an aspect, the polymeric layer 20 is a non-continuous layer. In an aspect, the polymeric layer 20 is a patterned layer or a textured layer.

In an aspect, the disclosure is directed to the polymeric layer 20 described herein disposed on a surface of the substrate 10. In some embodiments, the substrate 10 comprises a plastic, a metal, a mineral, a composite, a glass, a silane, concrete, a ceramic, wood, reconstituted wood, asphalt, pitch, tar, bitumen, paper, fused materials or agglomerated materials; and wherein the substrate is wet, dry, semi-wet or moist.

In some embodiments, the substrate 10 is wet. In some embodiments, the substrate 10 is dry. In some embodiments, the substrate 10 is semi-wet. In some embodiments, the substrate 10 is moist.

In some embodiments, the surface of the substrate 10 may be treated prior to disposal of the polymeric layer. In some embodiments, the surface of the substrate 10 is anodized. In some embodiments, the surface of the substrate 10 is phosphated.

In some embodiments, the substrate 10 comprises a metal. In some embodiments, the metal is Ti, V, Cr, Mn, Fe, Co, Ni, Cu, W, Zr, Al, Au, Ag, or combinations thereof, or alloys, blends, or oxides of any of these metals.

In some embodiments, the metal is Ti, an alloy comprising Ti, a blend comprising Ti, or an oxide comprising Ti. In some embodiments, the metal is V, an alloy comprising V, a blend comprising V, or an oxide comprising V. In some embodiments, the metal is Cr, an alloy comprising Cr, a blend comprising Cr, or an oxide comprising Cr. In some embodiments, the metal is Mn, an alloy comprising Mn, a blend comprising Mn, or an oxide comprising Mn. In some embodiments, the metal is Fe, an alloy comprising Fe, a blend comprising Fe, or an oxide comprising Fe. In some embodiments, the metal is Co, an alloy comprising Co, a blend comprising Co, or an oxide comprising Co. In some embodiments, the metal is Ni, an alloy comprising Ni, a blend comprising Ni, or an oxide comprising Ni. In some embodiments, the metal is Cu, an alloy comprising Cu, a blend comprising Cu, or an oxide comprising Cu. In some embodiments, the metal is W, an alloy comprising W, a blend comprising W, or an oxide comprising W. In some embodiments, the metal is Zr, an alloy comprising Zr, a blend comprising Zr, or an oxide comprising Zr. In some embodiments, the metal is Al, an alloy comprising Al, a blend comprising Al, or an oxide comprising Al. In some embodiments, the metal is Au, an alloy comprising Au, a blend comprising Au, or an oxide comprising Au. In some embodiments, the metal is Ag, an alloy comprising Ag, a blend comprising Ag, or an oxide comprising Ag.

In some embodiments, the substrate 10 comprises a metal comprising aluminum or steel. In some embodiments, the aluminum or steel is dry. In some embodiments, the aluminum or steel is wet. In some embodiments, the aluminum or steel is semi-wet. In some embodiments, the aluminum or steel is moist.

In some embodiments, the aluminum comprises anodized aluminum. In some embodiments, the steel comprises phosphate steel.

In some embodiments, the substrate 10 comprises a plastic. In some embodiments, the substrate 10 comprises a mineral. In some embodiments, the substrate 10 comprises a ceramic. In some embodiments, the substrate 10 comprises a glass. In some embodiments, the substrate 10 comprises a silane. In some embodiments, the substrate 10 comprises concrete. In some embodiments, the substrate 10 comprises a composite. In some embodiments, the substrate 10 comprises a ceramic. In some embodiments, the substrate 10 comprises wood. In some embodiments, the substrate 10 comprises reconstituted wood. In some embodiments, the substrate 10 comprises asphalt. In some embodiments, the substrate 10 comprises pitch. In some embodiments, the substrate 10 comprises tar. In some embodiments, the substrate 10 comprises bitumen. In some embodiments, the substrate 10 comprises paper. In some embodiments, the substrate 10 comprises fused materials. In some embodiments, the substrate 10 comprises agglomerated materials.

The embodiments of the present invention have been described in terms of a thin film on a substrate. In one embodiment, the invention relates to coating of the thin film on porous substrates. Stated differently, the thin film can be coated onto the available surfaces of a porous surface, which includes coating on the external surface of such porous structure as well as the pores and tortuous channels within the porous substrate. It is likely that the thin film may only partially coat the internal surfaces available within the pores of the porous substrate. This invention also relates to coating of such porous substrates wherein a viscosity, surface tension, and hydrophobicity changing additive is used to increase the available internal surface of such porous substrate.

In an aspect, the disclosure is directed to the polymeric layer 20 described herein in contact with a polymer matrix 30. In some embodiments, the polymer matrix 30 is a bulk adhesive, a sealant, a coating, an ink, a pressure-sensitive adhesive (PSA), a composite or a film.

In some embodiments, the polymer matrix 30 is a bulk adhesive. In some embodiments, the polymer matrix 30 is a sealant. In some embodiments, the polymer matrix 30 is a coating. In some embodiments, the polymer matrix 30 is an ink. In some embodiments, the polymer matrix 30 is a pressure-sensitive adhesive (PSA). In some embodiments, the polymer matrix 30 is a composite. In some embodiments, the polymer matrix 30 is a film.

In some embodiments, the polymer matrix 30 comprises a polyester. In some embodiments, the polymer matrix 30 comprises a urethane. In some embodiments, the polymer matrix 30 comprises a phenol. In some embodiments, the polymer matrix 30 comprises an epoxy, an acrylic or a silane. In some embodiments, the polymer matrix 30 comprises an epoxy. In some embodiments, the polymer matrix 30 comprises an acrylic. In some embodiments, the polymer matrix 30 comprises a silane. In some embodiments, the polymer matrix 30 comprises a silicone.

In some embodiments, the polymer matrix 30 is a continuous layer. In some embodiments, the polymer matrix 30 is a non-continuous layer. In some embodiments, the polymer matrix 30 is a patterned layer or a textured layer.

In some embodiments, the polymeric layer 20 and the polymer matrix 30 form an interpenetrating polymer network (IPN). An IPN as used herein is taken to mean at least two polymer networks that are at least partially interlaced on a molecular scale but not covalently bonded to each other and cannot be separated unless chemical bonds are broken.

In some embodiments, the polymeric layer 20 and the polymer matrix 30 form a semi-interpenetrating polymer network (SIPN). A SIPN as used herein is taken to mean one or more polymer networks and one or more linear or branched polymer(s) characterized by the penetration on a molecular scale of at least one of the networks by at least some of the linear or branched macromolecules.

In some embodiments, the polymeric layer 20 and the polymer matrix 30 form a sequential interpenetrating polymer network (SeIPN). A SeIPN as used herein is taken to mean an interpenetrating polymer network prepared by a process in which the second component network is formed following the formation of the first component network.

In some embodiments, the polymeric layer 20 and the polymer matrix 30 form a sequential semi-interpenetrating polymer network (SSeIPN). A SSeIPN as used herein is taken to mean a polymer network prepared by a process in which the linear or branched components are formed following the completion of the reactions that lead to the formation of the network(s) or vice versa.

In some embodiments, a second substrate 50 is disposed on the polymer matrix 30. In some embodiments, the second substrate 50 is disposed on and in contact with the polymer matrix 30. In some embodiments, a second polymeric layer 20 is disposed between the polymer matrix 30 and the second substrate 50.

In an aspect, the disclosure is directed to methods of making a substrate comprising disposing the polymeric layer 20 described herein on a surface of the substrate 10. The methods of disposing the polymeric layer 20 described herein are not particularly limited and will be recognized by those skilled in the art.

In some embodiments, the methods of making a substrate comprise disposing the polymeric layer 20 on a substrate 10 by spin coating, dip coating, spray coating, ink jet printing, flood coating, brushing, wiping, or the like. In some embodiments, the methods comprise disposing the polymeric layer 20 on a substrate 10 by spin coating. In some embodiments, the methods comprise disposing the polymeric layer 20 on a substrate 10 by dip coating. In some embodiments, the methods comprise disposing the polymeric layer 20 on a substrate 10 by spray coating. In some embodiments, the methods comprise disposing the polymeric layer 20 on a substrate 10 by ink jet printing. In some embodiments, the methods comprise disposing the polymeric layer 20 on a substrate 10 by flood coating. In some embodiments, the methods comprise disposing the polymeric layer 20 on a substrate 10 by brushing. In some embodiments, the methods comprise disposing the polymeric layer 20 on a substrate 10 by wiping.

In some embodiments, the methods of making a substrate comprise disposing the polymeric layer 20 on a substrate 10, wherein the polymeric layer 20 is applied to the substrate 10 as a solution. In some embodiments, the solution comprises from about 0.001% by weight to about 10% by weight of the catechol containing polymer or oligomer. In some embodiments, the solution comprises from about 0.01% by weight to about 5% by weight of the catechol containing polymer or oligomer. In some embodiments, the solution comprises from about 0.01% by weight to about 1% by weight of the catechol containing polymer or oligomer. In some embodiments, the solution comprises from about 0.1% by weight to about 1% by weight of the catechol containing polymer or oligomer.

In some embodiments, the solution comprises from about 0.001% by weight to about 0.005% by weight of the catechol containing polymer or oligomer; or from about 0.005% by weight to about 0.01% by weight of the catechol containing polymer or oligomer; or from about 0.01% by weight to about 0.02% by weight of the catechol containing polymer or oligomer; or from about 0.02% by weight to about 0.03% by weight of the catechol containing polymer or oligomer; or from about 0.03% by weight to about 0.04% by weight of the catechol containing polymer or oligomer; or from about 0.04% by weight to about 0.05% by weight of the catechol containing polymer or oligomer; or from about 0.05% by weight to about 0.06% by weight of the catechol containing polymer or oligomer; or from about 0.06% by weight to about 0.07% by weight of the catechol containing polymer or oligomer; or from about 0.07% by weight to about 0.08% by weight of the catechol containing polymer or oligomer; or from about 0.08% by weight to about 0.09% by weight of the catechol containing polymer or oligomer; or from about 0.09% by weight to about 0.1% by weight of the catechol containing polymer or oligomer; or from about 0.1% by weight to about 0.11% by weight of the catechol containing polymer or oligomer; or from about 0.11% by weight to about 0.12% by weight of the catechol containing polymer or oligomer; or from about 0.12% by weight to about 0.13% by weight of the catechol containing polymer or oligomer; or from about 0.13% by weight to about 0.14% by weight of the catechol containing polymer or oligomer; or from about 0.14% by weight to about 0.15% by weight of the catechol containing polymer or oligomer; or from about 0.15% by weight to about 0.2% by weight of the catechol containing polymer or oligomer; or from about 0.2% by weight to about 0.25% by weight of the catechol containing polymer or oligomer; or from about 0.25% by weight to about 0.3% by weight of the catechol containing polymer or oligomer; or from about 0.3% by weight to about 0.35% by weight of the catechol containing polymer or oligomer; or from about 0.35% by weight to about 0.4% by weight of the catechol containing polymer or oligomer; or from about 0.4% by weight to about 0.45% by weight of the catechol containing polymer or oligomer; or from about 0.45% by weight to about 0.5% by weight of the catechol containing polymer or oligomer; or from about 0.5% by weight to about 0.75% by weight of the catechol containing polymer or oligomer; or from about 0.75% by weight to about 1% by weight of the catechol containing polymer or oligomer; or from about 1.25% by weight to about 1.5% by weight of the catechol containing polymer or oligomer; or from about 1.5% by weight to about 1.75% by weight of the catechol containing polymer or oligomer; or from about 1.75% by weight to about 2% by weight of the catechol containing polymer or oligomer.

In some embodiments, the catechol containing polymer or oligomer used in the solution is poly-catechol styrene (PCS). In some embodiments, the solution comprises from about 0.001% by weight to about 10% by weight of PCS. In some embodiments, the solution comprises from about 0.01% by weight to about 5% by weight of PCS. In some embodiments, the solution comprises from about 0.01% by weight to about 1% by weight of PCS. In some embodiments, the solution comprises from about 0.1% by weight to about 1% by weight of PCS.

In some embodiments, the solution comprises from about 0.001% by weight to about 0.005% by weight of PCS; or from about 0.005% by weight to about 0.01% by weight of PCS; or from about 0.01% by weight to about 0.02% by weight of PCS; or from about 0.02% by weight to about 0.03% by weight of PCS; or from about 0.03% by weight to about 0.04% by weight of PCS; or from about 0.04% by weight to about 0.05% by weight of PCS; or from about 0.05% by weight to about 0.06% by weight of PCS; or from about 0.06% by weight to about 0.07% by weight of PCS; or from about 0.07% by weight to about 0.08% by weight of PCS; or from about 0.08% by weight to about 0.09% by weight of PCS; or from about 0.09% by weight to about 0.1% by weight of PCS; or from about 0.1% by weight to about 0.11% by weight of PCS; or from about 0.11% by weight to about 0.12% by weight of PCS; or from about 0.12% by weight to about 0.13% by weight of PCS; or from about 0.13% by weight to about 0.14% by weight of PCS; or from about 0.14% by weight to about 0.15% by weight of PCS; or from about 0.15% by weight to about 0.2% by weight of PCS; or from about 0.2% by weight to about 0.25% by weight of PCS; or from about 0.25% by weight to about 0.3% by weight of PCS; or from about 0.3% by weight to about 0.35% by weight of PCS; or from about 0.35% by weight to about 0.4% by weight of PCS; or from about 0.4% by weight to about 0.45% by weight of PCS; or from about 0.45% by weight to about 0.5% by weight of PCS; or from about 0.5% by weight to about 0.75% by weight of PCS; or from about 0.75% by weight to about 1% by weight of PCS; or from about 1.25% by weight to about 1.5% by weight of PCS; or from about 1.5% by weight to about 1.75% by weight of PCS; or from about 1.75% by weight to about 2% by weight of PCS.

In some embodiments, the solution also comprises an aqueous or organic solvent for dissolving the catechol containing polymer or oligomer. In some embodiments, the organic solvent is acetone, toluene, chloroform, dichloromethane (DCM), ethyl acetate, methyl ethyl ketone (MEK) or a combination thereof.

In some embodiments, the organic solvent is acetone. In some embodiments, the organic solvent is toluene. In some embodiments, the organic solvent is chloroform. In some embodiments, the organic solvent is dichloromethane (DCM). In some embodiments, the organic solvent is ethyl acetate. In some embodiments, the organic solvent is methyl ethyl ketone (MEK). In some embodiments, the organic solvent is a combination of acetone and toluene. In some embodiments, the organic solvent is acetone and the catechol containing polymer or oligomer is PCS. In some embodiments, the organic solvent is toluene and the catechol containing polymer or oligomer is PCS. In some embodiments, the organic solvent is a combination of acetone and toluene and the catechol containing polymer or oligomer is PCS.

The pH of the solution is not particularly limited. In some embodiments, the pH of the solution is about 3; or about 3.5; or about 4; or about 4.5; or about 5; or about 5.5; or about 6; or about 6.5; or about 7; or about 7.5; or about 8; or about 8.5; or about 9; or about 9.5; or about 10; or about 10.5; or about 11.

In some embodiments, the pH of the solution is from about 3-3.5; or about 3.5-4; or about 4-4.5; or about 4.5-5; or about 5-5.5; or about 5.5-6; or about 6-6.5; or about 6.5-7; or about 7-7.5; or about 7.5-8; or about 8-8.5; or about 8.5-9; or about 9-9.5; or about 9.5-10; or about 10-10.5; or about 10.5-11.

In some embodiments, the methods of making a substrate comprise disposing the polymeric layer 20 on a substrate 10, wherein the substrate 10 comprises a plastic, a metal, a mineral, a composite, a glass, a silane, concrete, a ceramic, wood, reconstituted wood, asphalt, pitch, tar, bitumen, paper, fused materials or agglomerated materials; and wherein the substrate is wet, dry, semi-wet or moist.

In some embodiments, the methods of making a substrate 10 comprise disposing the polymeric layer 20 on a substrate 10 comprising plastic. In some embodiments, the methods comprise disposing the polymeric layer 20 on a substrate 10 comprising metal. In some embodiments, the methods comprise disposing the polymeric layer 20 on a substrate 10 comprising a mineral. In some embodiments, the methods comprise disposing the polymeric layer 20 on a substrate 10 comprising a composite. In some embodiments, the methods comprise disposing the polymeric layer 20 on a substrate 10 comprising glass. In some embodiments, the methods comprise disposing the polymeric layer 20 on a substrate 10 comprising silane. In some embodiments, the methods comprise disposing the polymeric layer 20 on a substrate 10 comprising concrete. In some embodiments, the methods comprise disposing the polymeric layer 20 on a substrate 10 comprising ceramic. In some embodiments, the methods comprise disposing the polymeric layer 20 on a substrate 10 comprising wood. In some embodiments, the methods comprise disposing polymeric layer 20 on a substrate 10 comprising reconstituted wood. In some embodiments, the methods comprise disposing the polymeric layer 20 on a substrate 10 comprising asphalt. In some embodiments, the methods comprise disposing the polymeric layer 20 on a substrate 10 comprising pitch. In some embodiments, the methods comprise disposing the polymeric layer 20 on a substrate 10 comprising tar. In some embodiments, the methods comprise disposing the polymeric layer on a substrate comprising bitumen. In some embodiments, the methods comprise disposing the polymeric layer 20 on a substrate 10 comprising paper. In some embodiments, the methods comprise disposing the polymeric layer 20 on a substrate 10 comprising fused materials. In some embodiments, the methods comprise disposing the polymeric layer 20 on a substrate 10 comprising agglomerated materials.

In some embodiments, the methods of making a substrate comprise disposing the polymeric layer 20 on a wet substrate 10. In some embodiments, the methods comprise disposing the polymeric layer 20 on a dry substrate 10. In some embodiments, the methods comprise disposing the polymeric layer 20 on a semi-wet substrate 10. In some embodiments, the methods comprise disposing the polymeric layer 20 on a moist substrate 10.

In some embodiments, the methods of making a substrate comprise treating a surface of the substrate 10 prior to disposal of the polymeric layer described herein. In some embodiments, the methods comprise anodizing a surface of the substrate 10 prior to disposal of the polymeric layer. In some embodiments, the methods comprise phosphating a surface of the substrate 10 prior to disposal of the polymeric layer.

In some embodiments, the methods of making a substrate comprise disposing the polymeric layer 20 on a substrate 10 comprising metal. In some embodiments, the metal is Ti, V, Cr, Mn, Fe, Co, Ni, Cu, W, Zr, Al, or combinations thereof, or alloys, blends, or oxides of any of these metals.

In some embodiments, the methods of making a substrate comprise disposing the polymeric layer 20 on a substrate 10 comprising Ti, an alloy comprising Ti, a blend comprising Ti, or an oxide comprising Ti. In some embodiments, the methods comprise disposing the polymeric layer 20 on a substrate 10 comprising V, an alloy comprising V, a blend comprising V, or an oxide comprising V. In some embodiments, the methods comprise disposing the polymeric layer 20 on a substrate 10 comprising Cr, an alloy comprising Cr, a blend comprising Cr, or an oxide comprising Cr. In some embodiments, the methods comprise disposing the polymeric layer 20 on a substrate 10 comprising Mn, an alloy comprising Mn, a blend comprising Mn, or an oxide comprising Mn. In some embodiments, the methods comprise disposing the polymeric layer 20 on a substrate 10 comprising Fe, an alloy comprising Fe, a blend comprising Fe, or an oxide comprising Fe. In some embodiments, the methods comprise disposing the polymeric layer 20 on a substrate 10 comprising Co, an alloy comprising Co, a blend comprising Co, or an oxide comprising Co. In some embodiments, the methods comprise disposing the polymeric layer 20 on a substrate 10 comprising Ni, an alloy comprising Ni, a blend comprising Ni, or an oxide comprising Ni. In some embodiments, the methods comprise disposing the polymeric layer 20 on a substrate 10 comprising Cu, an alloy comprising Cu, a blend comprising Cu, or an oxide comprising Cu. In some embodiments, the methods comprise disposing the polymeric layer 20 on a substrate 10 comprising W, an alloy comprising W, a blend comprising W, or an oxide comprising W. In some embodiments, the methods comprise disposing the polymeric layer 20 on a substrate 10 comprising Zr, an alloy comprising Zr, a blend comprising Zr, or an oxide comprising Zr. In some embodiments, the methods comprise disposing the polymeric layer 20 on a substrate 10 comprising Al, an alloy comprising Al, a blend comprising Al, or an oxide comprising Al.

In some embodiments, the methods of making a substrate comprise disposing the polymeric layer 20 on a substrate 10 comprising aluminum or steel. In some embodiments, the methods comprise disposing the polymeric layer 20 on a substrate 10 comprising dry aluminum or dry steel. In some embodiments, the methods comprise disposing the polymeric layer 20 on a substrate 10 comprising semi-wet aluminum or semi-wet steel. In some embodiments, the methods comprise disposing the polymeric layer 20 on a substrate 10 comprising moist aluminum or moist steel.

In some embodiments, the methods of making a substrate comprise disposing the polymeric layer 20 on a substrate 10 comprising anodized aluminum. In some embodiments, the methods of making a substrate comprise disposing the polymeric layer 20 on a substrate 10 comprising phosphated steel.

In some embodiments, the methods of making a substrate comprise disposing the polymeric layer 20 on a substrate 10 in a dry environment. In some embodiments, the methods comprise disposing the polymeric layer 20 on a substrate 10 in an ambient environment. In some embodiments, the methods comprise disposing the polymeric layer 20 on a substrate 10 in a humid environment. In some embodiments, the methods comprise disposing the polymeric layer 20 on a substrate 10 in an aqueous environment. In some embodiments, the methods comprise disposing the polymeric layer 20 on a substrate 10 in an underwater environment.

In some embodiments, the methods of making a substrate comprise disposing the polymeric layer 20 on a substrate 10 as a continuous layer. In some embodiments, the methods of making a substrate comprise disposing the polymeric layer 20 on a substrate 10 as a non-continuous layer. In some embodiments, the methods of making a substrate comprise disposing the polymeric layer 20 on a substrate 10 as a patterned layer or a textured layer.

In an aspect, the disclosure is directed to methods of making a substrate comprising disposing the polymeric layer 20 described herein on a surface of the substrate 10, and further comprising disposing a polymer matrix 30 on the polymeric layer 20. The methods of disposing the polymer matrix 30 described herein are not particularly limited and will be recognized by those skilled in the art.

In some embodiments, the methods of making a substrate comprise disposing the polymer matrix 30 on the polymeric layer 20 by spin coating, dip coating, spray coating, ink jet printing, flood coating, brushing, wiping, or the like. In some embodiments, the methods comprise disposing the polymer matrix 30 on the polymeric layer 20 by spin coating. In some embodiments, the methods comprise disposing the polymer matrix 30 on the polymeric layer 20 by dip coating. In some embodiments, the methods comprise disposing the polymer matrix 30 on the polymeric layer 20 by spray coating. In some embodiments, the methods comprise disposing the polymer matrix 30 on the polymeric layer 20 by ink jet printing. In some embodiments, the methods comprise disposing the polymer matrix 30 on the polymeric layer 20 by flood coating. In some embodiments, the methods comprise disposing the polymer matrix 30 on the polymeric layer 20 by brushing. In some embodiments, the methods comprise disposing the polymer matrix 30 on the polymeric layer 20 by wiping.

In some embodiments, the polymer matrix 30 is a bulk adhesive, a sealant, a coating, an ink, a pressure-sensitive adhesive (PSA), a composite or a film.

In some embodiments, the methods of making a substrate comprise disposing a bulk adhesive 30 on the polymeric layer 20. In some embodiments, the methods comprise disposing a sealant 30 on the polymeric layer 20. In some embodiments, the methods comprise disposing a coating 30 on the polymeric layer 20. In some embodiments, the methods comprise disposing an ink 30 on the polymeric layer 20. In some embodiments, the methods comprise disposing a pressure-sensitive adhesive (PSA) 30 on the polymeric layer 20. In some embodiments, the methods comprise disposing a composite 30 on the polymeric layer 20. In some embodiments, the methods comprise disposing a film 30 on the polymeric layer 20.

In some embodiments, the polymer matrix 30 comprises a polyester, a urethane, a phenol, an epoxy, an acrylic, a silane or a silicone.

In some embodiments, the methods of making a substrate comprise disposing a polyester on the polymeric layer 20. In some embodiments, the methods comprise disposing a urethane on the polymeric layer 20. In some embodiments, the methods comprise disposing a phenol on the polymeric layer 20. In some embodiments, the methods comprise disposing an epoxy, an acrylic or a silane on the polymeric layer 20. In some embodiments, the methods comprise disposing an epoxy on the polymeric layer 20. In some embodiments, the methods comprise disposing an acrylic on the polymeric layer 20. In some embodiments, the methods comprise disposing a silane on the polymeric layer 20. In some embodiments, the methods comprise disposing a silicone on the polymeric layer 20.

In some embodiments, the methods of making a substrate comprise disposing the polymer matrix 30 on the polymeric layer 20 in a dry environment. In some embodiments, the methods comprise disposing the polymer matrix 30 on the polymeric layer 20 in an ambient environment. In some embodiments, the methods comprise disposing the polymer matrix 30 on the polymeric layer in a humid environment. In some embodiments, the methods comprise disposing the polymer matrix 30 on the polymeric layer 20 in an aqueous environment. In some embodiments, the methods comprise disposing the polymer matrix 30 on the polymeric layer 20 in an underwater environment.

In some embodiments, the methods of making a substrate comprise disposing the polymer matrix 30 on the polymeric layer 20 on a substrate as a continuous layer. In some embodiments, the methods comprise disposing the polymer matrix 30 on the polymeric layer 20 as a non-continuous layer. In some embodiments, the methods comprise disposing the polymer matrix 30 on the polymeric layer 20 as a patterned layer or a textured layer.

In some embodiments, the methods for disposing the polymer matrix 30 as a non-continuous layer or for disposing the polymeric layer 20 as a non-continuous layer comprise disposing the layers in an ordered pattern or a stochastic pattern.

In some embodiments, the ordered pattern comprises strips, a grid, concentric circles or a dot pattern. In some embodiments, the methods comprise disposing the polymer matrix 30 and/or the polymeric layer 20 as strips. In some embodiments, the methods comprise disposing the polymer matrix 30 and/or the polymeric layer 20 as a grid. In some embodiments, the methods comprise disposing the polymer matrix 30 and/or the polymeric layer 20 as concentric circles. In some embodiments, the methods comprise disposing the polymer matrix 30 and/or the polymeric layer 20 as a dot pattern.

In some embodiments, the methods comprise disposing the polymer matrix 30 and/or the polymeric layer 20 stochastically.

The polymer matrix 30 and/or the polymeric layer 20 can be disposed in particular shapes or in an amorphous manner. In some embodiments, the methods comprise disposing the polymer matrix 30 and/or the polymeric layer 20 as a dot, a circle, a square, a rectangle, a pentagon, a hexagon; or as amorphous.

In an embodiment, the polymer matrix 30 and/or the polymeric layer 20 are shaped as a dot. In an embodiment, the polymer matrix 30 and/or the polymeric layer 20 are shaped as a circle. In an embodiment, the polymer matrix 30 and/or the polymeric layer 20 are shaped as an oval. In an embodiment, the polymer matrix 30 and/or the polymeric layer 20 are shaped as a triangle. In an embodiment, the polymer matrix 30 and/or the polymeric layer 20 are shaped as a square. In an embodiment, the polymer matrix 30 and/or the polymeric layer 20 are shaped as a rectangle. In an embodiment, the polymer matrix 30 and/or the polymeric layer 20 are shaped as a pentagon. In an embodiment, the polymer matrix 30 and/or the polymeric layer 20 are shaped as a hexagon. In an embodiment, the polymer matrix 30 and/or the polymeric layer 20 are amorphous.

In some embodiments, the methods comprise disposing the polymer matrix 30 and/or the polymeric layer 20 as gridlines, criss-cross lines, random lines, concentric circles, eccentric circles, spaghetti patterns and flat strips.

In an embodiment, the polymer matrix 30 and/or the polymeric layer 20 are shaped as gridlines. In an embodiment, the polymer matrix 30 and/or the polymeric layer 20 are shaped as criss-cross lines. In an embodiment, the polymer matrix 30 and/or the polymeric layer 20 are shaped as random lines. In an embodiment, the polymer matrix 30 and/or the polymeric layer 20 are shaped as concentric circles. In an embodiment, the polymer matrix 30 and/or the polymeric layer 20 are shaped as eccentric circles. In an embodiment, the polymer matrix 30 and/or the polymeric layer 20 are shaped as a spaghetti pattern. In an embodiment, the polymer matrix 30 and/or the polymeric layer 20 are shaped as a flat strip.

In an aspect, the disclosure is directed to a layered structure comprising the polymeric layer 20 described herein.

In an aspect, the disclosure is directed to a layered structure comprising the polymeric layer 20 described herein disposed on a substrate 10.

In an aspect, the disclosure is directed to a layered structure comprising the polymeric layer 20 described herein disposed between a substrate 10 and a polymer matrix 30.

In an aspect, the disclosure is directed to a layered structure comprising the polymeric layer 20 described herein disposed between a substrate 10 and a polymer matrix 30, and further comprising a second substrate 50 disposed on the polymer matrix 30.

In an aspect, the disclosure is directed to a layered structure comprising the polymeric layer 20 described herein disposed between a substrate 10 and a polymer matrix 30, and further comprising a second polymeric layer 20 disposed on the polymer matrix 30.

In an aspect, the disclosure is directed to a layered structure comprising the polymeric layer 20 described herein disposed between a substrate 10 and a polymer matrix 30, and further comprising a second polymeric layer 20 disposed between the second substrate 50 and the polymer matrix 30.

In an aspect, the disclosure is directed to an article comprising the polymeric layer 20 described herein.

In an aspect, the disclosure is directed to an article comprising the polymeric layer 20 described herein disposed on a substrate 10.

In an aspect, the disclosure is directed to an article comprising the polymeric layer 20 described herein disposed between a substrate 10 and a polymer matrix 30.

In an aspect, the disclosure is directed to an article comprising the polymeric layer 20 described herein disposed between a substrate 10 and a polymer matrix 30, and further comprising a second substrate 50 disposed on the polymer matrix 30.

In an aspect, the disclosure is directed to an article comprising the polymeric layer 20 described herein disposed between a substrate 10 and a polymer matrix 30, and further comprising a second polymeric layer 20 disposed on the polymer matrix 30.

In an aspect, the disclosure is directed to an article comprising the polymeric layer 20 described herein disposed between a substrate 10 and a polymer matrix 30, and further comprising a second polymeric layer 20 disposed between the second substrate 50 and the polymer matrix 30.

The following Example is provided to illustrate some of the concepts described within this disclosure. While the Example is considered to provide an embodiment, it should not be considered to limit the more general embodiments described herein.

EXAMPLES

Example 1—Effect of Poly(Catechol-Styrene) PCS Based Primer on Two-Part Isocyanate (Urethane) Adhesive Performance on Dry Steel and Dry Aluminum Epoxy resin (Poly(Bisphenol A-co-epichlorohydrin)) was added in varying concentrations (1%, 5%, and 10%), to the PCS primer and test performance of the resin alone. An Epoxy catalyst (1,4-diazabicyclo[2.2.2]octane) was then added to the PCS primer alone in a concentration of 1:100 (catalyst to PCS). The Epoxy resin in a 10% concentration (to PCS) and catalyst in a 1% (to PCS) concentration together was added into the primer formulation. Stock solutions of F0043 and F0044 were prepared as follows:

F0043—Stock 0.1% wt. Poly(Bisphenol A-co-epichlorohydrin) in Toluene

F0044—Stock 0.1% wt. 1,4-diazabicyclo[2.2.2]octane in Toluene.

Four primer solutions (F0046, F0047, F0048, F0053) were prepared. The primer solutions were tested on two different types of Epoxy adhesive using both dry steel and dry aluminum as substrates. 120 dry steel samples and 120 dry aluminum samples were prepared and cleaned. The primer solutions were applied to the dry steel and aluminum samples and allowed to sit for 24 hours prior to the application of either Epoxy 1 or Epoxy 2. Details of the primers used are described below in Table 1.

TABLE 1

Primers of Example 1

| Formula ID | Formula Description | Preparation |
|---|---|---|
| F0001 | 0.1% PCS (25% Catechol) (Acetone) | Add 0.1 g PCS 25% to 100 ml Acetone |
| F0046 | 0.1% PCS (25% Catechol) with 0.005% Poly(Bisphenol A co-epichlorohydrin) | to 10 ml F0001 add 0.5 ml of F0043 |
| F0047 | 0.1% PCS (25% Catechol) with 0.01% Poly(Bisphenol A co-epichlorohydrin) | to 10 ml F0001 add 1.0 ml of F0043 |
| F0048 | 0.1% PCS (25% Catechol) with 0.001% 1,4-DIAZABICLO | to 10 ml of F0001 add 0.1 ml of F0044 |
| F0053 | 0.1% PCS (25% Catechol) with 0.001% 1,4-DIAZABICLO and 0.01% Poly(Bisphenol A co-epichlorohydrin) | to 10 ml of F0001 add 0.1 ml of F0044 and 1.0 ml of F0043 |

Figure 2:
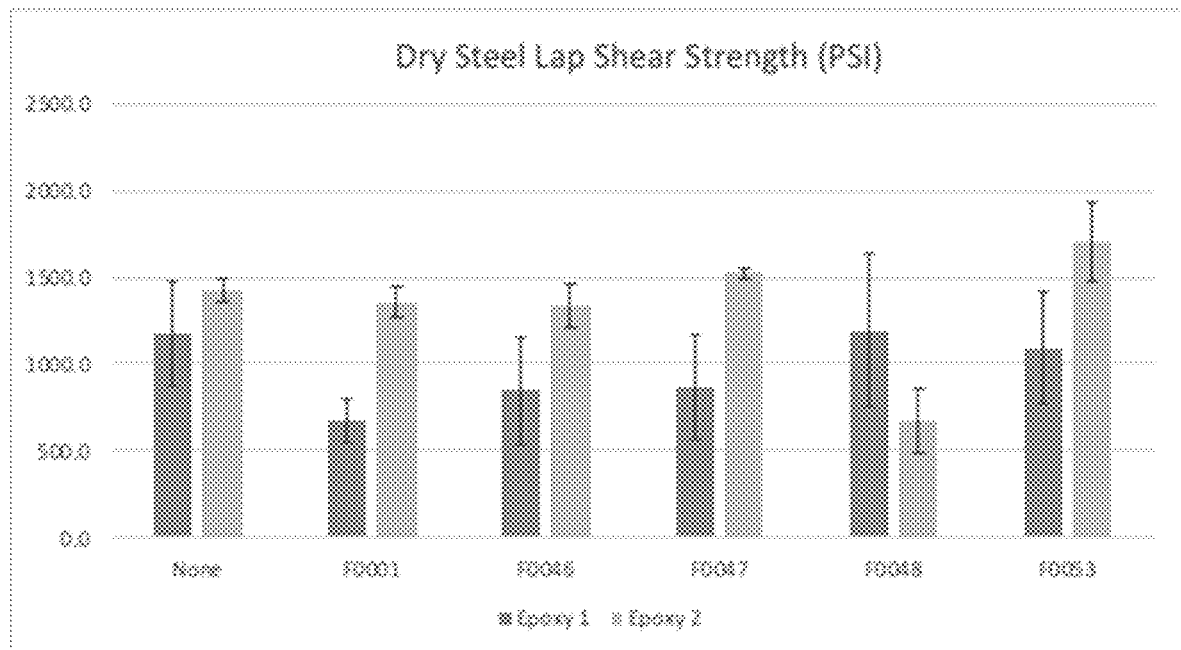
FIG. 2 depicts a bar graph of average lap shear strength (PSI) for dry steel with Epoxy 1 and Epoxy 2 using the inventive formulations and a comparative formulation.
Figure 3:
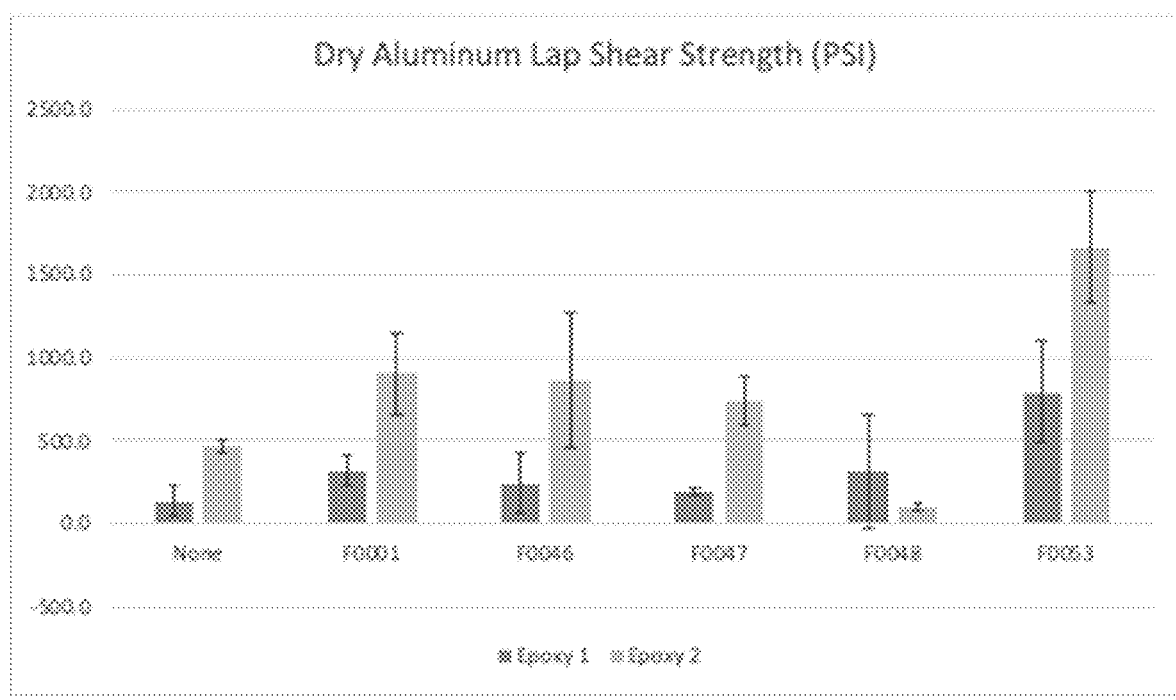
FIG. 3 depicts a bar graph of average lap shear strength (PSI) for dry aluminum with Epoxy 1 and Epoxy 2 using the inventive formulations and a comparative formulation.

Tested were Single-Lap-Joint Adhesively Bonded Metal Specimens (ASTM D1002) utilizing Steel (A366-1008), Aluminum (5086). The results for average lap shear strength (PSI) for dry steel and dry aluminum with Epoxy 1 and Epoxy 2 are shown below in Table 2. The results are also displayed in graphic format for dry steel (FIG. 2) and for dry aluminum (FIG. 3). The standard deviations for the results in Table 2 are shown below in Table 3.

TABLE 2

Average Lap Shear Strength (PSI) on Dry Steel and Dry Aluminum

| Primer | Adhesive-Epoxy 1 | | Adhesive-Epoxy 2 | |
|---|---|---|---|---|
| Formula | Dry Steel | Dry Aluminum | Dry Steel | Dry Aluminum |
| None | 1175.1 | 136.6 | 1428.8 | 461.7 |
| F0001 | 671.0 | 318.0 | 1357.7 | 905.8 |
| F0046 | 851.4 | 241.7 | 1341.0 | 860.9 |
| F0047 | 871.3 | 194.5 | 1525.8 | 745.1 |
| F0048 | 1197.2 | 315.6 | 674.3 | 96.8 |
| F0053 | 1094.6 | 795.0 | 1702.1 | 1666.8 |

TABLE 3

Standard Deviations for the Results of Table 2

| Primer | Adhesive-Epoxy 1 | | Adhesive-Epoxy 2 | |
|---|---|---|---|---|
| Formula | Dry Steel | Dry Aluminum | Dry Steel | Dry Aluminum |
| None | 297.0 | 85.0 | 70.7 | 41.2 |
| F0001 | 125.3 | 96.2 | 85.3 | 247.8 |
| F0046 | 308.5 | 182.9 | 124.5 | 402.6 |
| F0047 | 300.3 | 23.2 | 32.0 | 143.2 |
| F0048 | 440.4 | 342.4 | 179.0 | 17.8 |
| F0053 | 321.8 | 303.8 | 229.0 | 337.6 |

Example 2—Effect of PCS Based Primer on Isocyanate (Urethane) Adhesive Performance on Aluminum, Anodized Aluminum and Steel The objective of this experiment was to test the performance of a PCS primer with an isocyanate (urethane) adhesive. Tested were Single-Lap-Joint Adhesively Bonded Metal Specimens (ASTM D1002) utilizing Steel (A366-1008), Aluminum (5086), and Anodized Aluminum. Samples were bonded in both dry and underwater environments. Various primers using two different PCS polymers with varying catechol content (25% and 35%) were tested. For each polymer, concentrations of 1% (by wt.) and 0.1% (by wt.) of the PCS in Acetone were tested. For controls, lap shear specimens with no primer, and a 0.1% poly-styrene primer, were tested. By comparing the force required to bring each bond to failure, the effect of the PCS primer on overall bond strength was determined.

Metal samples (4 inch by 1 inch) are cleaned by wiping with Acetone (Aluminum and Anodized Aluminum) or Toluene (Steel). 5 separate primer solutions (plus a control using no primer) were tested. Details of the primers used are described below in Table 4.

TABLE 4

Primers of Example 2

| Formula ID | Formula Description | Preparation |
|---|---|---|
| F0002 | 0.1% Poly-Styrene | Add 0.1 g Poly-styrene to 100 ml Acetone |
| F0009 | 1% PCS (25% Catechol) | to 10 ml of Acetone, add 0.1 g of PCS (25% catechol) |
| F0012 | 0.1% PCS (25% Catechol) | to 1 ml of F0009, add 9 ml of Acetone |
| F0010 | 1% PCS (35% Catechol) | to 10 ml of Acetone, add 0.1 g of PCS (35% catechol) |
| F0011 | 0.1% PCS (35% Catechol) | to 1 ml of F0010, add 9 ml of Acetone |

Samples were primed by applying 0.1 ml of primer solution to each individual metal sample (both sides coming into contact with the adhesive are primed), solution was spread across the metal sample using a plastic pipette to evenly distribute. The solvent was allowed to evaporate leaving a thin film of primer on the surface.

Following priming, the samples were allowed to sit for 24 hours prior to bonding. To perform bonding, an isocyanate adhesive (Loctite 8x) was applied using a wooden applicator stick. The adhesive is spread across a 1" inch area, a second sample is then adhered to the first sample resulting in an overlap of 1" by 1". Samples were prepared either dry or bonded while underwater. In the case of the underwater bonding, the adhesive was applied to the metal sample under the water line. The samples were allowed to cure (dry samples in air, underwater samples in water), then pulled in a tensile strength measurement device to measure the force required to break the bond. Samples were pulled per ASTM D1002.

Figure 4:
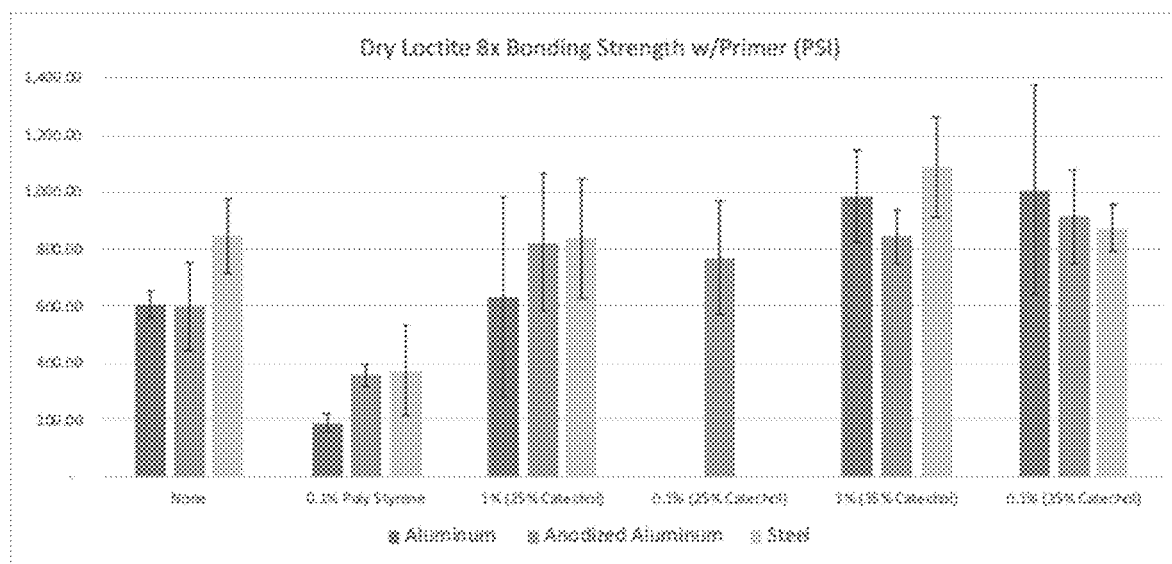
FIG. 4 depicts a bar graph of average tensile strength (PSI) for dry aluminum, dry anodized aluminum and dry steel with Loctite epoxy using the inventive formulations and a comparative formulation.

The results for average tensile strength (PSI) for dry aluminum, dry anodized aluminum and dry steel are shown below in Table 5. The results are also displayed in graphic format (FIG. 4). The standard deviations for the results in Table 5 are shown below in Table 6.

TABLE 5

Average Tensile Strength (PSI) on Dry Bonding

| Formula ID | Formula Description | Aluminum | Anodized Aluminum | Steel |
|---|---|---|---|---|
| None | None | 604.90 | 598.80 | 846.30 |
| F0002 | 0.1% Poly Styrene | 188.60 | 355.10 | 372.50 |
| F0009 | 1% (25% Catechol) | 631.40 | 822.70 | 837.20 |
| F0012 | 0.1% (25% Catechol) | — | 770.90 | — |
| F0010 | 1% (35% Catechol) | 986.20 | 842.40 | 1,087.30 |
| F0011 | 0.1% (35% Catechol) | 1,006.90 | 912.30 | 871.90 |

Table 6

Standard Deviations for the Results of Table 5

| Formula ID | Aluminum | Anodized Aluminum | Steel |
|---|---|---|---|
| None | 47.0 | 155.0 | 129.0 |
| F0002 | 33.0 | 36.0 | 159.0 |
| F0009 | 353.0 | 241.0 | 210.0 |
| F0012 | 0.0 | 199.0 | 0.0 |
| F0010 | 161.0 | 95.0 | 175.0 |
| F0011 | 368.0 | 166.0 | 81.8 |

Figure 5:
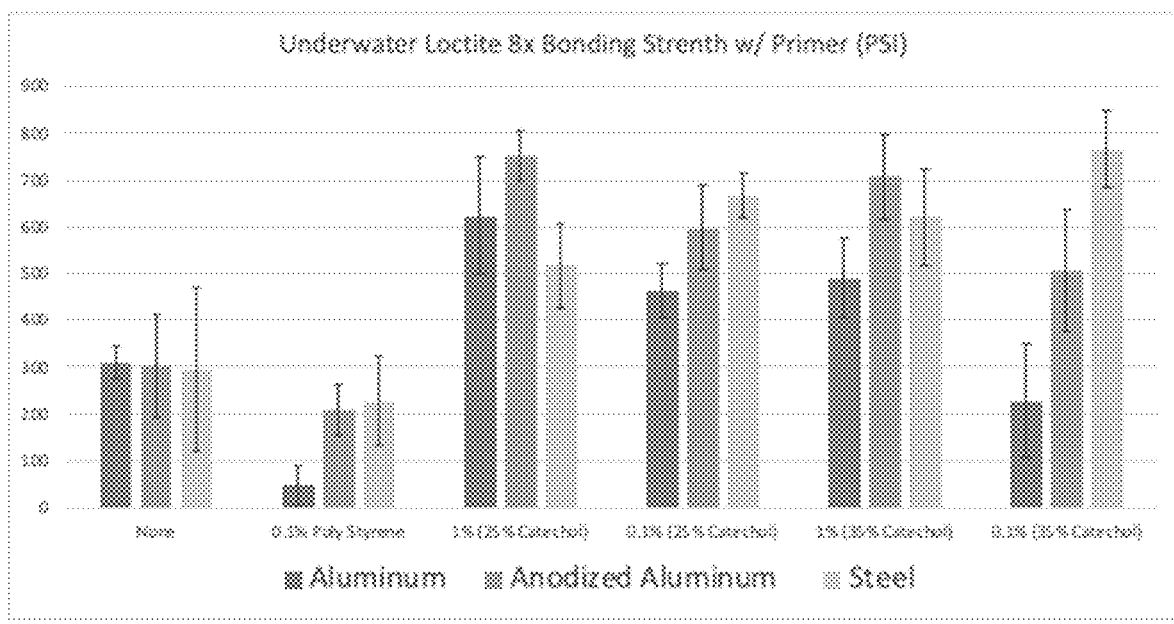
FIG. 5 depicts a bar graph of average tensile strength (PSI) for wet aluminum, wet anodized aluminum and wet steel with Loctite epoxy using the inventive formulations and a comparative formulation.

The results for average tensile strength (PSI) for wet aluminum, wet anodized aluminum and wet steel are shown below in Table 7. The results are also displayed in graphic format (FIG. 5). The standard deviations for the results in Table 7 are shown below in Table 8.

TABLE 7

Average Tensile Strength (PSI) on Wet Bonding

| Formula ID | Formula Description | Aluminum | Anodized Aluminum | Steel |
|---|---|---|---|---|
| None | None | 309.3 | 303.7 | 294.2 |
| F0002 | 0.1% Poly Styrene | 47.4 | 208.3 | 227.7 |
| F0009 | 1% (25% Catechol) | 623.3 | 752.2 | 518.2 |
| F0012 | 0.1% (25% Catechol) | 463.2 | 598.3 | 667.0 |
| F0010 | 1% (35% Catechol) | 488.9 | 708.1 | 620.7 |
| F0011 | 0.1% (35% Catechol) | 227.0 | 505.7 | 766.4 |

TABLE 8

Standard Deviations for the Results of Table 7

| Formula ID | Aluminum | Anodized Aluminum | Steel |
|---|---|---|---|
| None | 34.4 | 108.0 | 174.8 |
| F0002 | 44.0 | 54.9 | 95.2 |
| F0009 | 125.2 | 55.0 | 90.0 |
| F0012 | 57.7 | 88.9 | 47.4 |
| F0010 | 86.2 | 90.7 | 103.6 |
| F0011 | 120.5 | 132.9 | 81.8 |

Example 3—Effect of Additives to a PCS Based Primer on Isocyanate (Urethane) Adhesive Performance on Aluminum, Anodized Aluminum and Steel The objective of this experiment was to test the performance of a PCS primer, both with and without various additives, with an isocyanate (urethane) adhesive. Single-Lap-Joint Adhesively Bonded Metal Specimens (ASTM D1002) utilizing Steel (A366-1008), Aluminum (5086), and Anodized Aluminum was tested. Samples were bonded in both dry (steel only for dry samples) and underwater environments (all three metals). The addition of three compounds to our PCS base primer (1,6 Hexanediol, Urethane Catalyst from King Industries (K-Cat 6212), and 1,4-diazabicyclo[2.2.2]octane (DABCO), was tested. Each additive was tested on its own, then combined with the hexanediol with each of the catalyst compounds in a single primer formulation and tested again. For the dry steel samples, a 0.1% (35% catechol) PCS primer solution as the base for all catechol primers was used. For the wet samples a 0.1% (25% catechol) PCS primer solution as the base for all catechol primers was used. For controls, lap shear specimens with no primer, and a 0.1% poly-styrene primer, were used. By comparing the force required to bring each bond to failure, the effect of the PCS primer with and without additives on overall bond strength can be determined.

Metal samples (4 inch by 1 inch) were cleaned by wiping with Acetone (Aluminum and Anodized Aluminum) or Toluene (Steel). 5 separate primer solutions (plus a control using no primer) were tested. Details of the primers used are described below in Table 9 for dry primers and Table 10 for wet primers.

TABLE 9

Dry Primers of Example 3

| Formula ID | Formula Description | Preparation |
|---|---|---|
| F0002 | 0.1% Poly Styrene | Add 0.1 g Poly-styrene to 100 ml Acetone |
| F0011 | 0.1% PCS (35%) | to 10 ml of Acetone, add 0.1 g of PCS (35% catechol) |
| F0058 | 0.1% PCS (35%) + K-CAT 6212 | To 10 ml of F0011, add 0.1 ml of 0.1% K-CAT 6212 solution (ratio of K-CAT to PCS 1:100) |
| F0059 | 0.1% PCS (35%) + DABCO | To 10 ml of F0011, add 0.1 ml of 0.1% DABCO solution (ratio of DABCO to PCS 1:100) |
| F0060 | 0.1% PCS (35%) + Hexanediol | To 10 ml of F0011, add 1.0 ml of 0.1% Hexanediol solution (Ratio of Hexanediol to PCS 1:10) |
| F0061 | 0.1% PCS (35%) + K-CAT 6212 + Hexanediol | To 10 ml of F0011, add 0.1 ml of 0.1% K-CAT 6212 solution (ratio of K-CAT to PCS 1:100) and add 1.0 ml of 0.1% Hexanediol solution (Ratio of Hexanediol to PCS 1:10) |
| F0062 | 0.1% PCS (35%) + DABCO + Hexanediol | To 10 ml of F0011, add 0.1 ml of 0.1% DABCO solution (ratio of DABCO to PCS 1:100) and add 1.0 ml of 0.1% Hexanediol solution (Ratio of Hexanediol to PCS 1:10) |

TABLE 10

Wet Primers of Example 3

| Formula ID | Formula Description | Preparation |
|---|---|---|
| F0002 | 0.1% Poly Styrene | Add 0.1 g Poly-styrene to 100 ml Acetone |
| F0012 | 0.1% PCS (25%) | to 10 ml of Acetone, add 0.1 g of PCS (25% catechol) |
| F0063 | 0.1% PCS (35%) + K-CAT 6212 | To 10 ml of F0012, add 0.1 ml of 0.1% K-CAT 6212 solution (ratio of K-CAT to PCS 1:100) |
| F0064 | 0.1% PCS (35%) + DABCO | To 10 ml of F0012, add 0.1 ml of 0.1% DABCO solution (ratio of DABCO to PCS 1:100) |
| F0065 | 0.1% PCS (35%) + Hexanediol | To 10 ml of F0012, add 1.0 ml of 0.1% Hexanediol solution (Ratio of Hexanediol to PCS 1:10) |
| F0066 | 0.1% PCS (35%) + K-CAT 6212 + Hexanediol | To 10 ml of F0011, add 0.1 ml of 0.1% K-CAT 6212 solution (ratio of K-CAT to PCS 1:100) and add 1.0 ml of 0.1% Hexanediol solution (Ratio of Hexanediol to PCS 1:10) |
| F0067 | 0.1% PCS (35%) + DABCO + Hexanediol | To 10 ml of F0011, add 0.1 ml of 0.1% DABCO solution (ratio of DABCO to PCS 1:100) and add 1.0 ml of 0.1% Hexanediol solution (Ratio of Hexanediol to PCS 1:10) |

Samples were primed by applying 0.1 ml of primer solution to each individual metal sample (both sides coming into contact with the adhesive are primed), solution is spread across the metal sample using a plastic pipette to evenly distribute. The solvent was allowed to evaporate leaving a thin film of primer on the surface.

Following priming, the samples were allowed to sit for 24 hours prior to bonding. To perform bonding, an isocyanate adhesive (Loctite 8×) was applied using a wooden applicator stick. The adhesive was spread across a 1" inch area, a second sample is then adhered to the first sample resulting in an overlap of 1" by 1", then clamped together for the cure period. Samples were prepared either dry or bonded while underwater. In the case of the underwater bonding, the adhesive was applied to the metal sample under the water line. The samples were allowed to cure (dry samples in air, underwater samples in water), then pulled in a tensile strength measurement device to measure the force required to break the bond. Samples were pulled per ASTM D1002.

Figure 6:
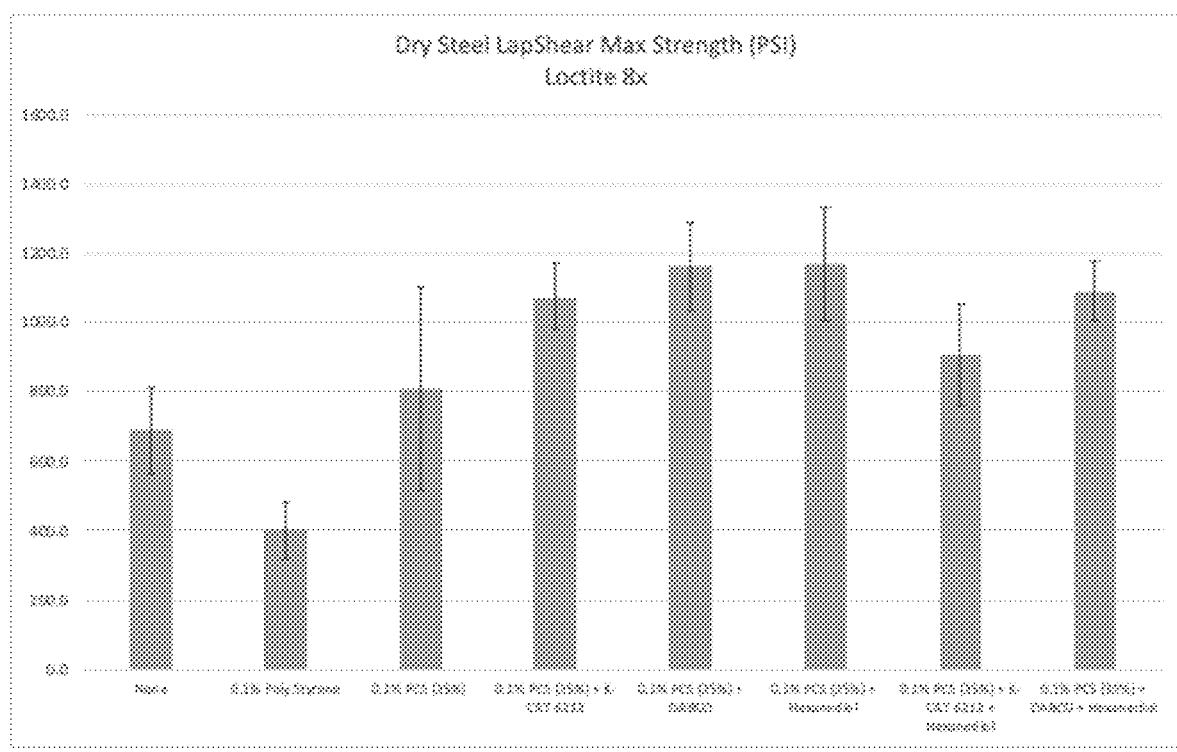
FIG. 6 depicts a bar graph of average lap shear strength (PSI) for dry steel with Loctite epoxy using the inventive formulations and a comparative formulation.

The results for average lap shear strength (PSI) for dry steel are shown below in Table 11. The results are also displayed in graphic format (FIG. 6). The standard deviations for the results in Table 11 are shown below in Table 12.

TABLE 11

Average Lap Shear Strengthm (PSI) on Dry Steel

| Formula ID | Formula Description | Steel |
|---|---|---|
| None | None | 687.9 |
| F0002 | 0.1% Poly Styrene | 403.1 |
| F0011 | 0.1% PCS (35%) | 809.2 |
| F0058 | 0.1% PCS (35%) + K-CAT 6212 | 1074.5 |
| F0059 | 0.1% PCS (35%) + DABCO | 1163.5 |
| F0060 | 0.1% PCS (35%) + Hexanediol | 1170.7 |
| F0061 | 0.1% PCS (35%) + K-CAT 6212 + Hexanediol | 907.7 |
| F0062 | 0.1% PCS (35%) + DABCO + Hexanediol | 1091.7 |

TABLE 12

Standard Deviations for the Results of Table 11

| Formula ID | Steel |
|---|---|
| None | 121.6 |
| F0002 | 80.2 |
| F0011 | 294.6 |
| F0058 | 98.0 |
| F0059 | 128.3 |
| F0060 | 164.0 |
| F0061 | 147.8 |
| F0062 | 84.0 |

Figure 7:
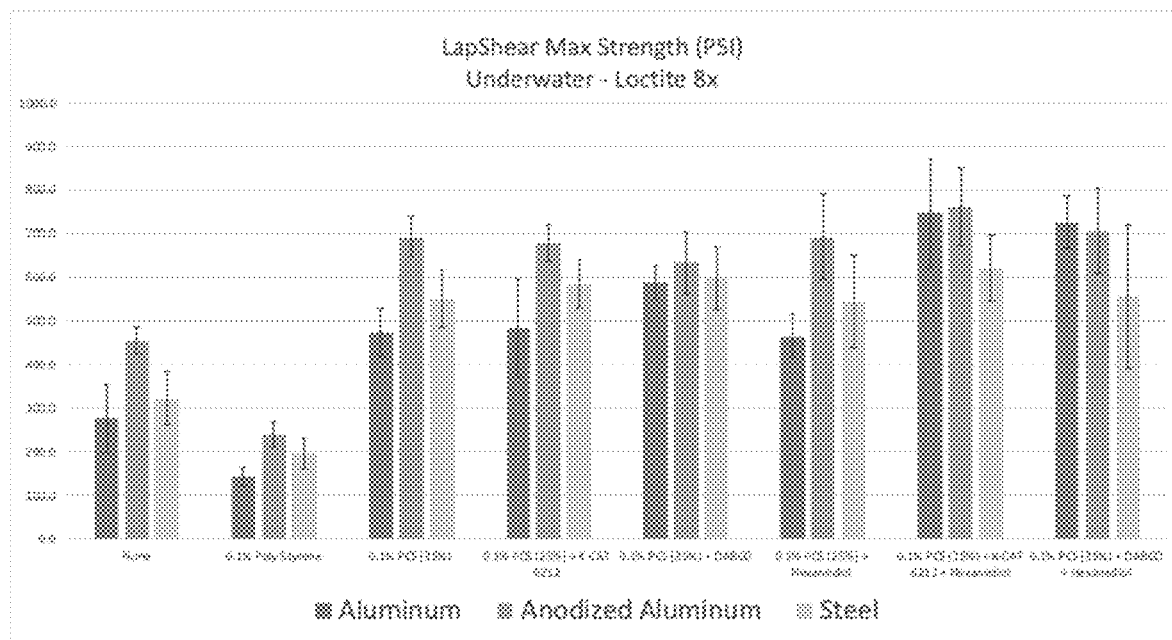
FIG. 7 depicts a bar graph of average lap shear strength (PSI) for wet aluminum, wet anodized aluminum and wet steel with Loctite epoxy using the inventive formulations and a comparative formulation.

The results for average lap shear strength (PSI) for wet aluminum, wet anodized aluminum and wet steel are shown below in Table 13. The results are also displayed in graphic format (FIG. 7). The standard deviations for the results in Table 13 are shown below in Table 14.

TABLE 13

Average Lap Shear Strength in Wet Bonding

| Formula ID | Formula Description | Aluminum | Anodized Aluminum | Steel |
|---|---|---|---|---|
| None | None | 275.8 | 455.3 | 323.2 |
| F0002 | 0.1% Poly Styrene | 143.3 | 240.1 | 196.1 |
| F0012 | 0.1% PCS (25%) | 474.0 | 692.8 | 552.1 |
| F0063 | 0.1% PCS (25%) + K-CAT 6212 | 483.4 | 677.4 | 584.5 |
| F0064 | 0.1% PCS (25%) + DABCO | 589.3 | 634.3 | 598.6 |
| F0065 | 0.1% PCS (25%) + Hexanediol | 465.1 | 692.8 | 544.8 |
| F0066 | 0.1% PCS (25%) + K-CAT 6212 + Hexanediol | 747.6 | 763.3 | 621.4 |
| F0067 | 0.1% PCS (25%) + DABCO + Hexanediol | 726.2 | 706.5 | 557.2 |

TABLE 14

Standard Deviations for the Results of Table 13

| Formula ID | Aluminum | Anodized Aluminum | Steel |
|---|---|---|---|
| None | 78.9 | 31.3 | 63.2 |
| F0002 | 20.9 | 29.8 | 36.5 |
| F0012 | 55.8 | 47.4 | 64.7 |
| F0063 | 112.8 | 42.1 | 53.9 |
| F0064 | 35.7 | 70.6 | 71.5 |
| F0065 | 50.1 | 96.7 | 106.5 |
| F0066 | 124.7 | 88.7 | 76.4 |
| F0067 | 59.7 | 98.1 | 164.3 |

Example 4—Effect of PCS Based Primer on Two-Part Urethane Adhesive Performance

The objective of this experiment was to test the performance of a PCS primer with a two-part urethane adhesive. Single-Lap-Joint Adhesively Bonded Metal Specimens (ASTM D1002) utilizing Steel (A366-1008), Aluminum (5086), and Anodized Aluminum was tested. Samples were bonded in both dry and underwater environments. Various primers using two different PCS polymers with varying catechol content (25% and 35%) were tested. For each polymer, concentrations of 0.1% (by wt.) of the PCS in Acetone were tested. For controls, lap shear specimens with no primer, and a 0.1% poly-styrene primer were tested. By comparing the force required to bring each bond to failure, the effect of the PCS primer on overall bond strength can be determined.

Metal samples (4 inch by 1 inch) were cleaned by wiping with Acetone (Aluminum and Anodized Aluminum) or Toluene (Steel). 3 separate primer solutions (plus a control using no primer) were tested. Details of the primers used are described below in Table 15.

TABLE 15

Primers of Example 4

| Formula ID | Formula Description | Preparation |
|---|---|---|
| F0002 | 0.1% Poly-Styrene | Add 0.1 g Poly-styrene to 100 ml Acetone |
| F0011 | 0.1% PCS (35% Catechol) | to 10 ml of Acetone, add 0.01 g of PCS (35% catechol) |
| F0012 | 0.1% PCS (25% Catechol) | to 10 ml of Acetone, add 0.01 g of PCS (25% catechol) |

Samples were primed by applying 0.1 ml of primer solution to each individual metal sample (both sides coming into contact with the adhesive are primed), solution is spread across the metal sample using a plastic pipette to evenly distribute. The solvent was allowed to evaporate leaving a thin film of primer on the surface.

Following priming, the samples were allowed to sit for 24 hours prior to bonding. To perform bonding, a two-part urethane adhesive (Loctite UK U-09FL) was applied using a wooden applicator stick. The adhesive was spread across a 1" inch area, a second sample is then adhered to the first sample resulting in an overlap of 1" by 1", then clamped together for the cure period. Samples were prepared either dry or bonded while underwater. In the case of the underwater bonding, the adhesive was applied to the metal sample under the water line. The samples were allowed to cure (dry samples in air, underwater samples in water), then pulled in a tensile strength measurement device to measure the force required to break the bond. Samples were pulled per ASTM D1002.

Figure 8:
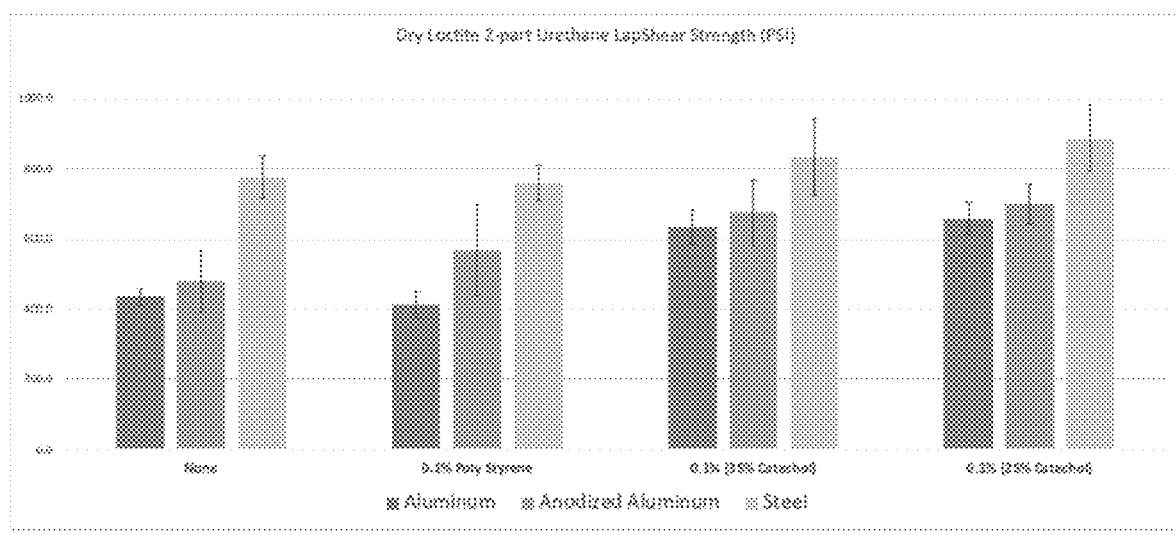
FIG. 8 depicts a bar graph of average lap shear strength (PSI) for dry aluminum, dry anodized aluminum and dry steel with 2-part Loctite epoxy using the inventive formulations and a comparative formulation.

The results for average tensile strength (PSI) for dry, aluminum, dry anodized aluminum and dry steel are shown below in Table 16. The results are also displayed in graphic format (FIG. 8). The standard deviations for the results in Table 16 are shown below in Table 17.

TABLE 16

Average Tensile Strength (PSI) on Dry Surfaces

| Formula ID | Formula Description | Aluminum | Anodized Aluminum | Steel |
|---|---|---|---|---|
| None | None | 432.4 | 477.2 | 775.1 |
| F0002 | 0.1% Poly Styrene | 410.7 | 566.4 | 757.0 |
| F0011 | 0.1% PCS (35% catechol) | 631.5 | 673.3 | 832.4 |
| F0012 | 0.1% PCS (25% catechol) | 656.6 | 697.5 | 885.9 |

TABLE 17

Standard Deviations for the Results of Table 16

| Formula ID | Aluminum | Anodized Aluminum | Steel |
|---|---|---|---|
| None | 23.9 | 88.5 | 59.3 |
| F0002 | 36.8 | 131.0 | 50.8 |
| F0011 | 47.9 | 93.9 | 109.6 |
| F0012 | 47.0 | 56.7 | 94.3 |

Figure 9:
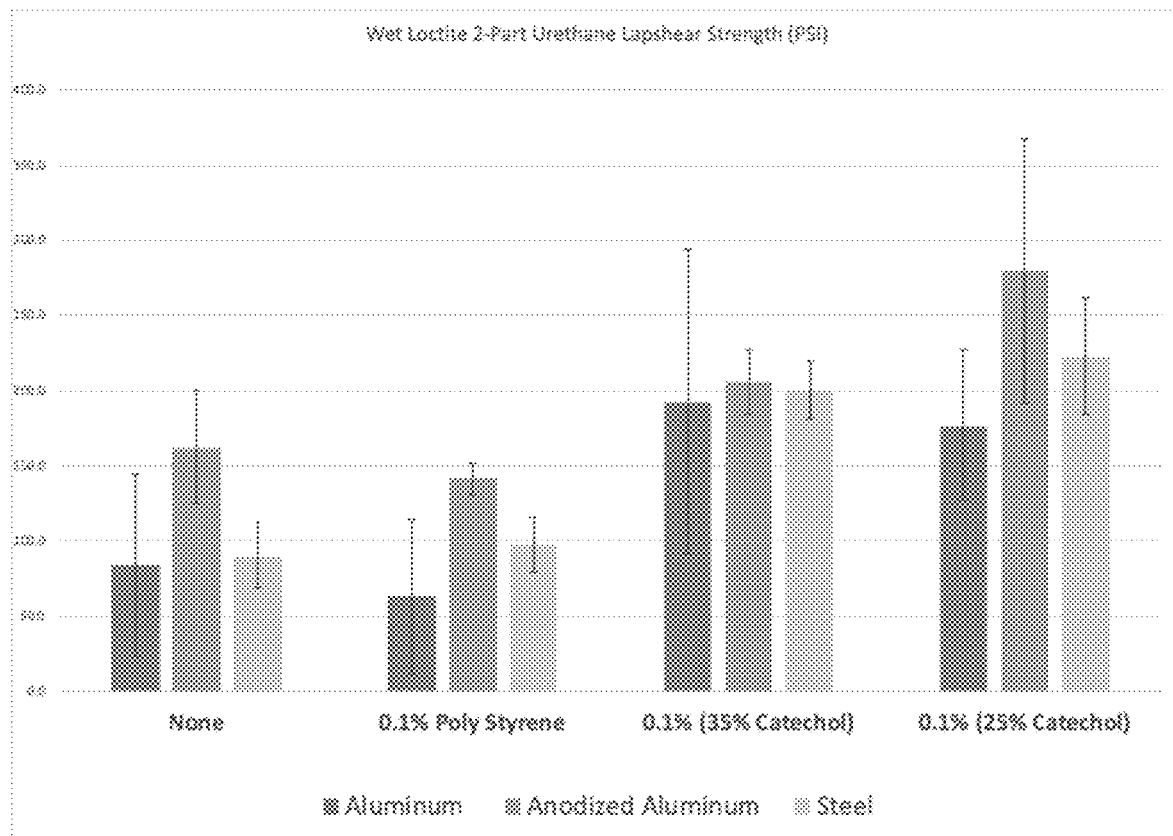
FIG. 9 depicts a bar graph of average lap shear strength (PSI) for wet aluminum, wet anodized aluminum and wet steel with 2-part Loctite epoxy using the inventive formulations and a comparative formulation.

The results for average tensile strength (PSI) for wet aluminum, wet anodized aluminum and wet steel are shown below in Table 18. The results are also displayed in graphic format (FIG. 9). The standard deviations for the results in Table 18 are shown below in Table 19.

TABLE 18

Average Tensile Strength (PSI) on Wet Surfaces

| Formula ID | Formula Description | Aluminum | Anodized Aluminum | Steel |
|---|---|---|---|---|
| None | None | 83.9 | 161.8 | 90.1 |
| F0002 | 0.1% Poly Styrene | 62.5 | 141.4 | 96.6 |
| F0011 | 0.1% PCS (35% catechol) | 192.2 | 205.2 | 200.3 |
| F0012 | 0.1% PCS (25% catechol) | 176.6 | 279.2 | 222.5 |

TABLE 19

Standard Deviations for the Results of Table 18

| Formula ID | Aluminum | Anodized Aluminum | Steel |
|---|---|---|---|
| None | 60.2 | 37.6 | 22.0 |
| F0002 | 51.8 | 10.4 | 18.2 |
| F0011 | 101.2 | 21.4 | 19.1 |
| F0012 | 50.2 | 88.2 | 38.7 |

Example 5—Effect of Additives to a PCS Based Primer on Two-Part Urethane Adhesive Performance The objective of this experiment was to test the performance of a PCS primer, both with and without various additives, with two-part urethane adhesive. Single-Lap-Joint Adhesively Bonded Metal Specimens (ASTM D1002) utilizing Steel (A366-1008), Aluminum (5086), and Anodized Aluminum was tested. Samples were bonded in dry conditions only due to the poor performance of this adhesive in underwater environments. The addition of three compounds to our PCS base primer (1,6 Hexanediol, Urethane Catalyst from King Industries (K-Cat 6212), and 1,4-diazabicyclo [2.2.2]octane (DABCO) was tested. Each additive on its own was tested, then combined with the hexanediol with each of the catalyst compounds in a single primer formulation and tested again. A 0.1% (25% catechol) PCS primer solution as the base for all catechol primers was used. For controls, lap shear specimens with no primer, and a 0.1% poly-styrene primer were tested. By comparing the force required to bring each bond to failure, the effect of the PCS primer with and without additives on overall bond strength can be determined.

Metal samples (4 inch by 1 inch) are cleaned by wiping with Acetone (Aluminum and Anodized Aluminum) or Toluene (Steel). 7 separate primer solutions (plus a control using no primer) were tested. Details of the primers used are described below in Table 20.

TABLE 20

Primers of Example 5

| Formula ID | Formula Description | Preparation |
|---|---|---|
| F0002 | 0.1% Poly Styrene | Add 0.1 g Poly-styrene to 100 ml Acetone |
| F0012 | 0.1% PCS (25%) | to 10 ml of Acetone, add 0.1 g of PCS (25% catechol) |
| F0063 | 0.1% PCS (35%) + K-CAT 6212 | To 10 ml of F0012, add 0.1 ml of 0.1% K-CAT 6212 solution (ratio of K-CAT to PCS 1:100) |
| F0064 | 0.1% PCS (35%) + DABCO | To 10 ml of F0012, add 0.1 ml of 0.1% DABCO solution (ratio of DABCO to PCS 1:100) |
| F0065 | 0.1% PCS (35%) + Hexanediol | To 10 ml of F0012, add 1.0 ml of 0.1% Hexanediol solution (Ratio of Hexanediol to PCS 1:10) |
| F0066 | 0.1% PCS (35%) + K-CAT 6212 + Hexanediol | To 10 ml of F0011, add 0.1 ml of 0.1% K-CAT 6212 solution (ratio of K-CAT to PCS 1:100) and add 1.0 ml of 0.1% Hexanediol solution (Ratio of Hexanediol to PCS 1:10) |
| F0067 | 0.1% PCS (35%) + DABCO + Hexanediol | To 10 ml of F0011, add 0.1 ml of 0.1% DABCO solution (ratio of DABCO to PCS 1:100) and add 1.0 ml of 0.1% Hexanediol solution (Ratio of Hexanediol to PCS 1:10) |

Samples were primed by applying 0.1 ml of primer solution to each individual metal sample (both sides coming into contact with the adhesive are primed), solution is spread across the metal sample using a plastic pipette to evenly distribute. The solvent was allowed to evaporate leaving a thin film of primer on the surface.

Following priming, the samples were allowed to sit for 24 hours prior to bonding. To perform bonding, a two-part urethane adhesive (Loctite UK U-09FL) was applied using a wooden applicator stick. The adhesive was spread across a 1" inch area, a second sample is then adhered to the first sample resulting in an overlap of 1" by 1", then clamped together for the cure period. Samples were prepared either dry or bonded while underwater. In the case of the underwater bonding, the adhesive was applied to the metal sample under the water line. The samples were allowed to cure (dry samples in air, underwater samples in water), then pulled in a tensile strength measurement device to measure the force required to break the bond. Samples were pulled per ASTM D1002.

Figure 10:
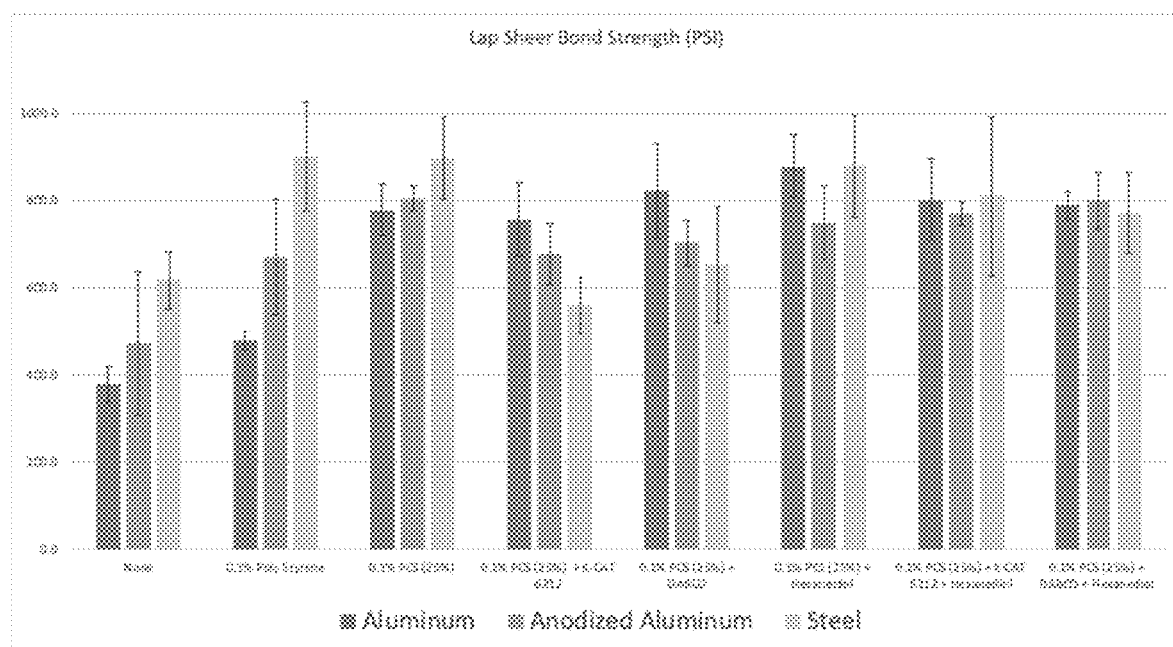
FIG. 10 depicts a bar graph of average lap shear strength (PSI) for dry aluminum, dry anodized aluminum and dry steel with a 2-part urethane adhesive using the inventive formulations and a comparative formulation.

The results for average lap shear strength (PSI) for dry, aluminum, dry anodized aluminum and dry steel are shown below in Table 21. The results are also displayed in graphic format (FIG. 10). The standard deviations for the results in Table 21 are shown below in Table 22.

TABLE 21

Average Lap Shear Strength (PSI) on Dry Surfaces

| Formula ID | Formula Description | Aluminum | Anodized Aluminum | Steel |
|---|---|---|---|---|
| None | None | 378.0 | 472.0 | 616.0 |
| F0002 | 0.1% Poly Styrene | 478.1 | 668.6 | 900.0 |
| F0012 | 0.1% PCS (25% catechol) | 776.8 | 804.7 | 898.3 |
| F0063 | 0.1% PCS (35%) + K-CAT 6212 | 756.4 | 676.7 | 559.0 |
| F0064 | 0.1% PCS (35%) + DABCO | 820.9 | 702.6 | 653.0 |
| F0065 | 0.1% PCS (35%) + Hexanediol | 877.2 | 747.7 | 878.0 |
| F0066 | 0.1% PCS (35%) + K-CAT 6212 + Hexanediol | 801.4 | 768.8 | 810.0 |
| F0067 | 0.1% PCS (35%) + DABCO + Hexanediol | 788.7 | 799.7 | 770.0 |

TABLE 22

Standard Deviations for the Results of Table 21

| Formula ID | Aluminum | Anodized Aluminum | Steel |
|---|---|---|---|
| None | 67.0 | 166.0 | 40.8 |
| F0002 | 127.1 | 132.6 | 19.9 |
| F0012 | 94.8 | 29.7 | 58.1 |
| F0063 | 64.3 | 71.7 | 84.1 |
| F0064 | 133.0 | 51.7 | 110.2 |
| F0065 | 117.6 | 84.9 | 72.8 |
| F0066 | 182.5 | 25.2 | 94.1 |
| F0067 | 92.7 | 65.2 | 30.0 |

Example 6—Effect of Additives to a PCS Based Primer on 3M Marine Adhesive Sealant 5200 Performance The objective of this experiment was to test the performance of a PCS primer, both with and without various additives, on 3M Marine Adhesive Sealant 5200. Single-Lap-Joint Adhesively Bonded Metal Specimens (ASTM D1002) were tested, utilizing aluminum (5086). Samples were bonded in both dry and underwater environments. The base primer was 0.1 wt % of PCS at 25% catechol content diluted in acetone. Additions of four compounds to our PCS base primer-1,6 hexanediol, urethane catalyst from King Industries (K-Cat 6212), 1,4-diazabicyclo[2.2.2]octane (DABCO), and polycaprolactone triol (PCL) were tested. A combination of K-Cat 6212 and 1,6 hexanediol was also analyzed. Lap shear specimens with no primer and a 0.1% poly-styrene primer were utilized as the controls. All samples were bonded with 3M 5200 and cured. The forces required to bring each bond to failure were compared, so as to enable determination of the effect of the PCS primer on overall bond strength.

140 aluminum metal samples (4 inch by 1 inch) were prepared by wiping with acetone. 7 separate primer solutions were tested. Details of the primers used are described below in Table 23.

TABLE 23

Primers of Example 6

| Formula ID | Formula Description | Preparation |
|---|---|---|
| F0012 | 0.1% PCS (25% Catechol) | to 1 ml of 1% PCS (25% catechol), add 9 ml of Acetone |
| F0063 | 0.1% PCS (25% Catechol) + K-CAT 6212 | to 9 ml Acetone add 1 ml of 1% PCS (25% catechol) and 0.1 ml of 0.1% K-CAT 6212 |
| F0064 | 0.1% PCS (25% Catechol) + DABCO | to 9 ml Acetone add 1 ml of 1% PCS (25% catechol) and 0.1 ml of 0.1% DABCO |
| F0065 | 0.1% PCS (25% Catechol) + hexanediol | to 8 ml Acetone add 1 ml of 1% PCS (25% catechol) and 1 ml of 0.1% 1,6 Hexanediol |
| F0069 | 0.1% PCS (25% Catechol) + PCL | to 8 mL of Acetone add 1 ml of 1% PCS (25% catechol) and 1 ml 0.1% PCL |
| F0066 | 0.1% PCS (35%) + K-CAT 6212 + hexanediol | to 8 ml Acetone add 1 ml of 1% PCS (25% catechol) and 1 ml of 0.1% 1,6 Hexanediol and 0.1 ml of 0.1% K-CAT 6212 |

Samples were primed by applying 0.1 ml of primer solution to each individual metal sample (both sides coming into contact with the adhesive are primed), solution is spread across the metal sample using a plastic pipette to evenly distribute. The solvent was allowed to evaporate leaving a thin film of primer on the surface.

Following priming, the samples were allowed to sit for 24 hours prior to bonding. Then, 3M Marine Adhesive Sealant 5200 was applied using a wooden applicator stick. On the samples where no primer was applied, the adhesive was spread across a 1" length segment at the end of the metal sample. A second sample with no primer was adhered to the first sample, resulting in an overlap of 1" by 1". In samples with primer, the adhesive was applied atop the primer in the same 1" length segment. A second sample was then adhered to the first sample, ensuring that the primer coated portion of the second sample was adhered to the adhesive coated portion of the first sample. An overlap of 1" by 1" was obtained. In all cases, the adhesive was applied to the dry aluminum samples in an environment exposed to air. The adhesive was applied to wet samples while submerged underwater. All bonded samples were clamped together, and any excess adhesive was wiped away.

The samples were allowed to cure in their respective environments—wet samples submerged in water and dry samples in air. Then, the 70 bonded samples were pulled with an Instron per ASTM D1002. The force (in psi) required to break the bond was recorded.

Figure 11:
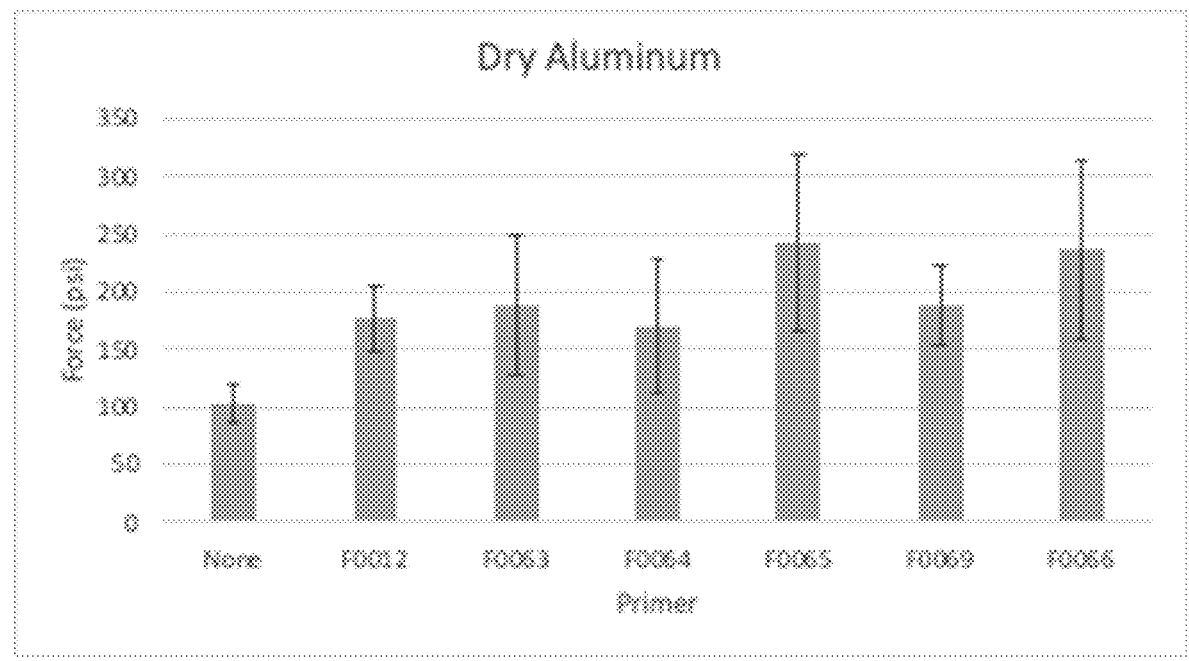
FIG. 11 depicts a bar graph of average lap shear strength (PSI) for dry aluminum with a Marine Adhesive Sealant 5200 using the inventive formulations and a comparative formulation.

The results for average lap shear strength (PSI) for dry aluminum are shown below in Table 24. The results are also displayed in graphic format (FIG. 11).

TABLE 24

Average Lap Shear Strength (PSI) on Dry Aluminum

| Formula ID | Aluminum | Standard Deviation |
|---|---|---|
| None | 103.86 | 17.51 |
| F0012 | 177.12 | 27.34 |
| F0063 | 187.88 | 60.52 |
| F0064 | 171.34 | 58.33 |
| F0065 | 243.24 | 76.4 |
| F0069 | 189.22 | 35.09 |
| F0066 | 236.68 | 76.72 |

Figure 12:
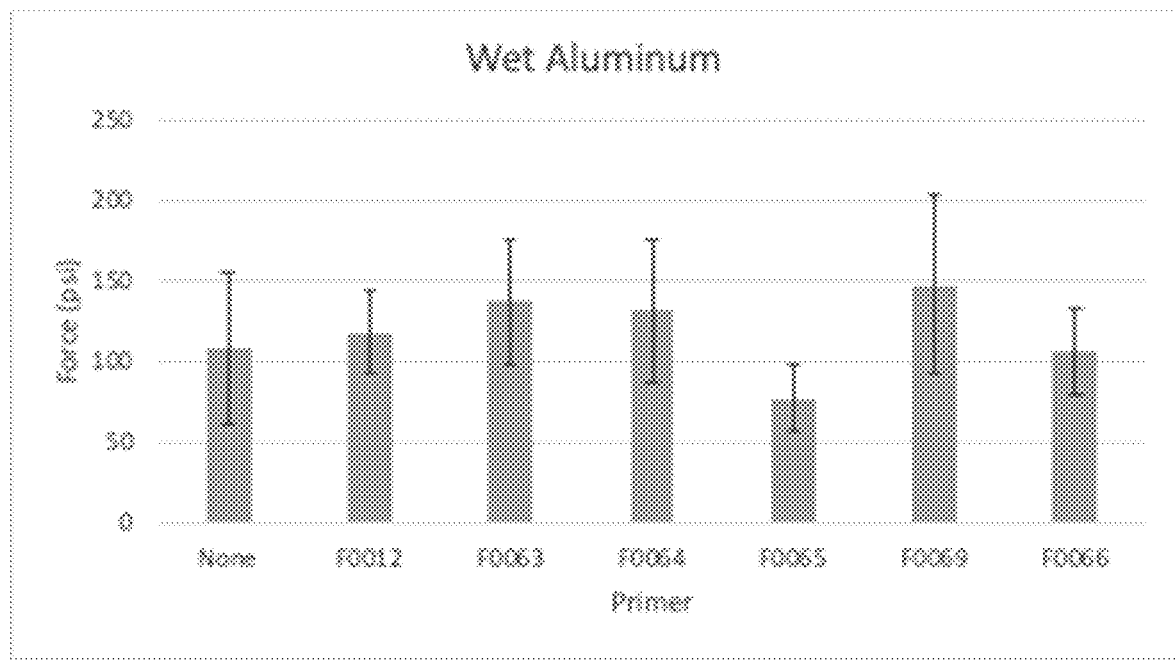
FIG. 12 depicts a bar graph of average lap shear strength (PSI) for wet aluminum with a Marine Adhesive Sealant 5200 using the inventive formulations and a comparative formulation.

The results for average lap shear strength (PSI) for wet aluminum are shown below in Table 25. The results are also displayed in graphic format (FIG. 12).

TABLE 25

Average Lap Shear Strength (PSI) on Wet Aluminum

| Formula ID | Aluminum | Standard Deviation |
|---|---|---|
| None | 107.9 | 47.44 |
| F0012 | 118.22 | 25.64 |
| F0063 | 137.24 | 38.41 |
| F0064 | 132.04 | 44.56 |
| F0065 | 77.72 | 19.73 |
| F0069 | 147.78 | 55.42 |
| F0066 | 106.72 | 26.4 |

Example 7—Phosphate Surface Treatments

A phosphate conversion coating was formed on the steel by submerging samples in a heated manganese dioxide, phosphoric acid, and water bath for one hour. These samples were primed with F0012 (0.1% PCS (25% Catechol), F0053 (0.1% PCS (25% Catechol) with 0.001% 1,4-DIAZABICLO and 0.01% Poly(Bisphenol A co-epichlorohydrin)), and a control with no primer, then used to make lap shears with Loctite E120HP two-part epoxy using a mixing tip in both wet and dry environments. A control set of non-coated lap shears was also prepared in the same way as the coated lap shears.

Figure 13:
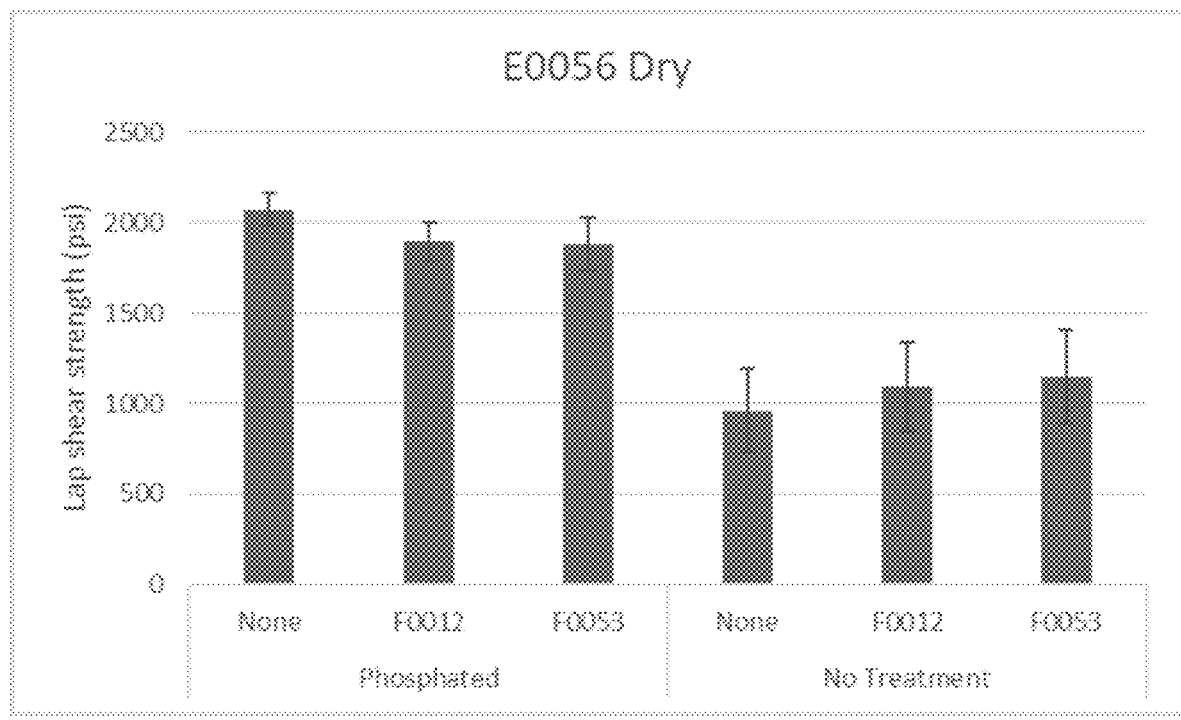
FIG. 13 depicts a bar graph of average lap shear strength (PSI) for dry phosphated steel compared to dry steel as-received using the inventive formulations and a comparative formulation.
Figure 14:
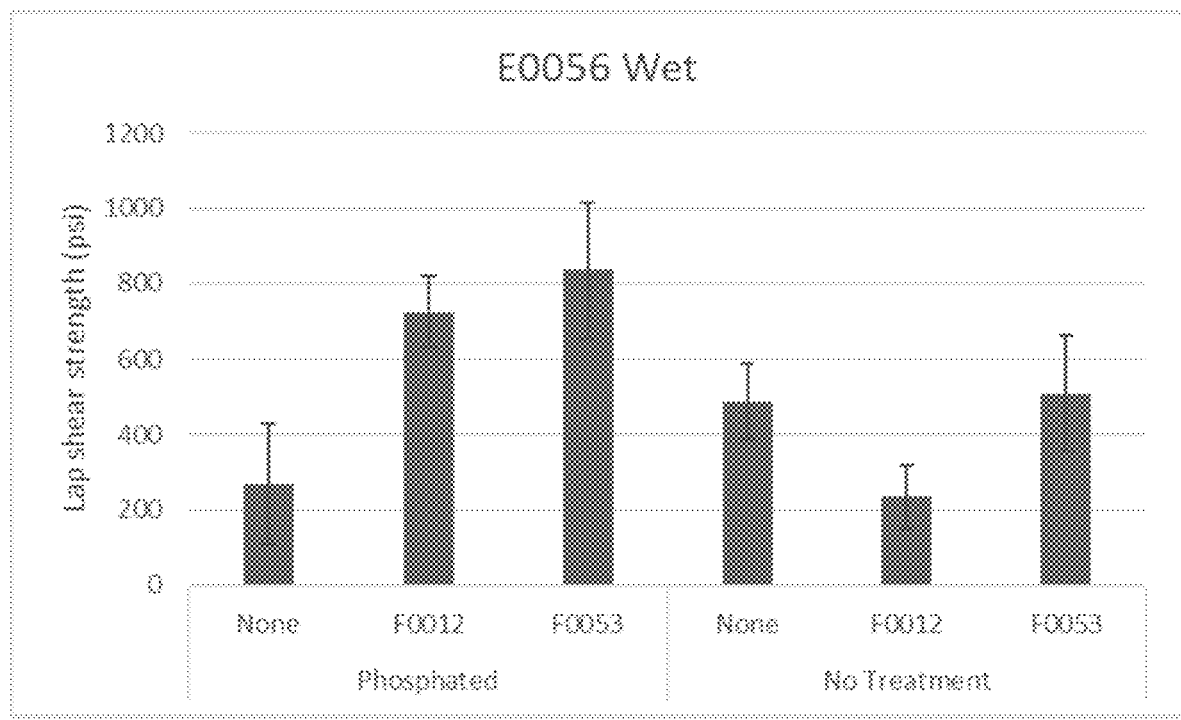
FIG. 14 depicts a bar graph of average lap shear strength (PSI) for wet phosphated steel compared to wet steel as-received using the inventive formulations and a comparative formulation.

The phosphate coating greatly increased the strength of the dry lap shears over the lap shears that had no treatment, as shown in FIG. 13. However, the treated wet lap shears saw a decrease in strength with respect to the non-treated lap shears, as shown in FIG. 14. This decrease in strength was mitigated with the use of primers which allowed for the treated lap shears to regain strength up to and surpassing that of the non-coated lap shears. While the stress state inside a lap shear is complex and so any statements made when analyzing the strain of lap shears is dubious, it is noted that the epoxy in the treated dry samples appeared to undergo yielding before failure which was not seen in the non-treated samples and is evidence of the increase in bond strength.

Figure 15:
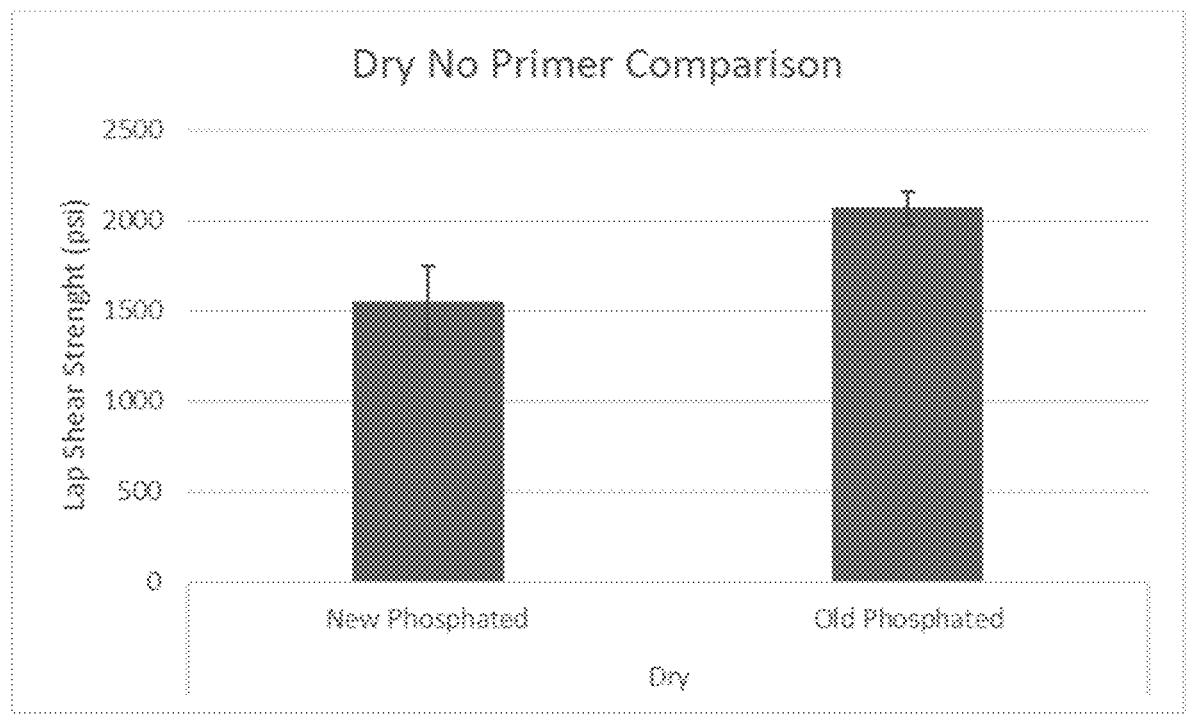
FIG. 15 depicts a bar graph of average lap shear strength (PSI) for dry phosphated old steel compared to dry phosphate new steel.
Figure 16:
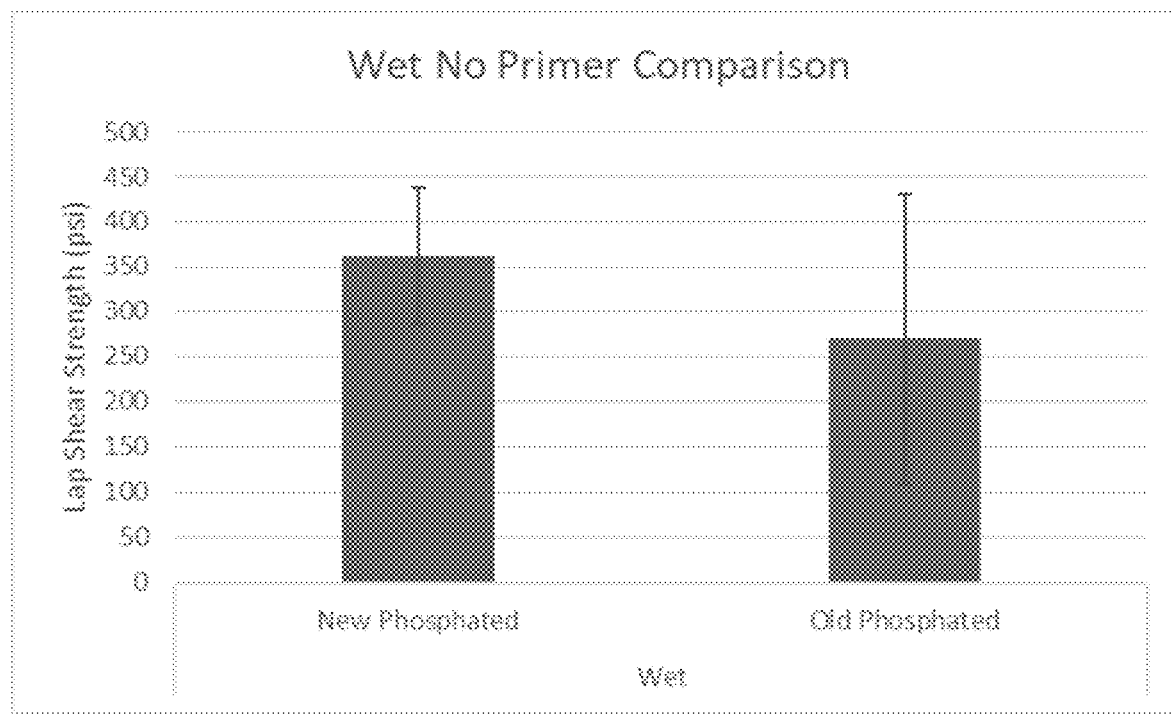
FIG. 16 depicts a bar graph of average lap shear strength (PSI) for wet phosphated old steel compared to wet phosphate new steel.

The control group of primer F0002 (0.1% Poly Styrene) was tested on new steel lap shears possibly of a different composition, so the phosphated no primer samples were repeated to look for any differences in the phosphate conversion coating, if the coating was different, there would be a change in the strength of the non-primed control samples. The results are shown in FIG. 15 (dry, no primer comparison) and FIG. 16 (wet, no primer comparison).

Noting that the difference in strength of phosphated and non-phosphated steel samples in FIGS. 13 and 14, where phosphated steel was stronger while dry and weaker when wet, it is apparent that the phosphate coating is not as developed in the new steel samples as it was with the old composition used.

Figure 17:
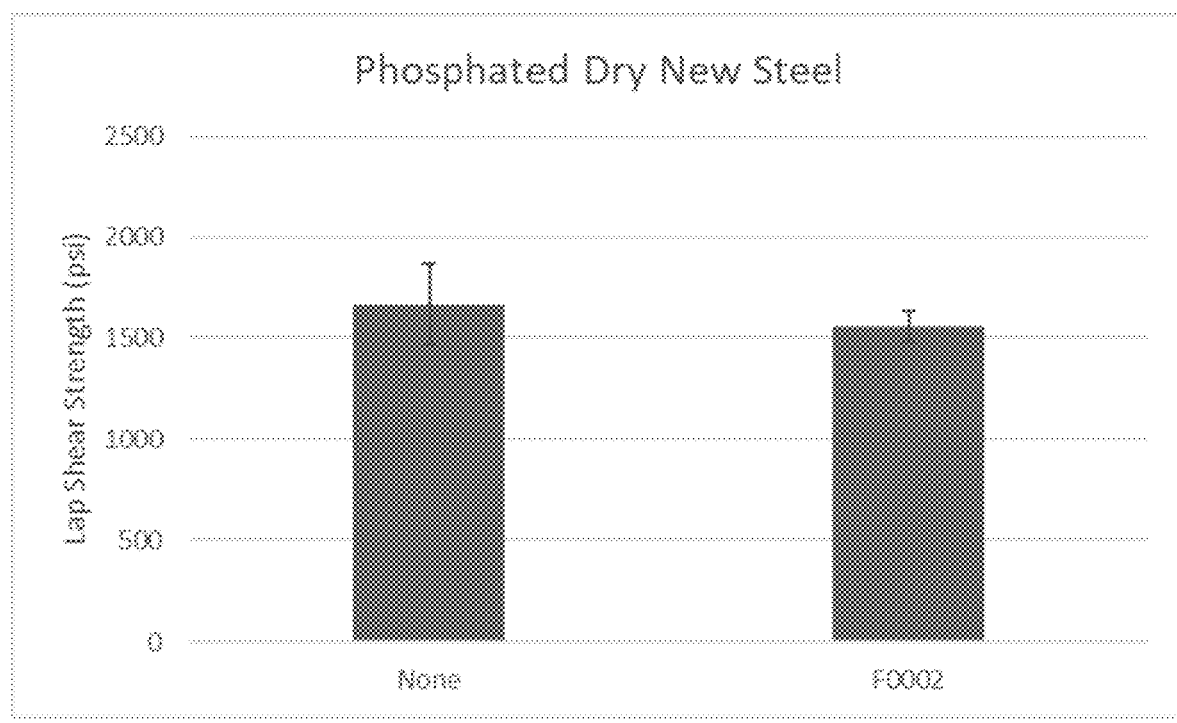
FIG. 17 depicts a bar graph of average lap shear strength (PSI) for dry new steel with F002 primer compared to a sample with no primer.
Figure 18:
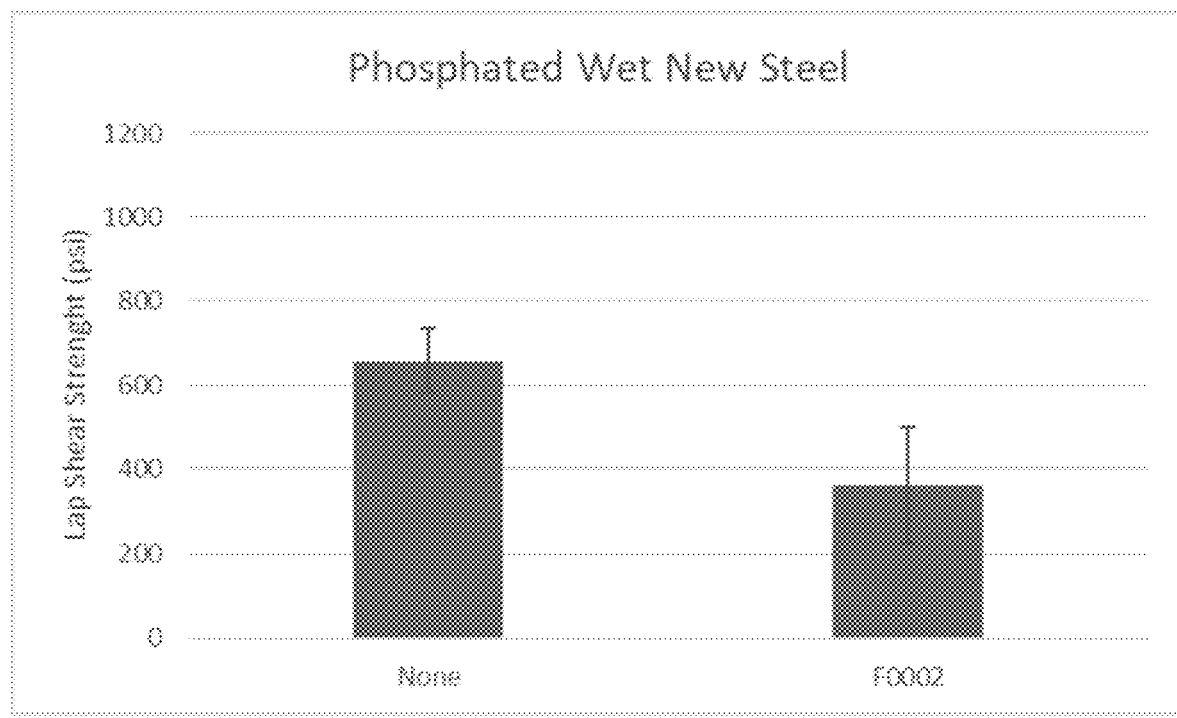
FIG. 18 depicts a bar graph of average lap shear strength (PSI) for wet new steel with F002 primer compared to a sample with no primer.

From FIGS. 17 and 18, it is shown that inclusion of F0002 results in a drop in strength of the lap shears. This decrease in strength goes against the previous hypothesis of the hydrophobicity of the primers playing a role in the increase in wet bonding strength and would point to the catechol playing a role in the increase.

Based on the above observations, it can be concluded that: 1) the method used to create the phosphate conversion coating works; 2) the primers appear to increase the strength of treated wet samples; and 3) composition of steel plays a role in the phosphate conversion coating.

Example 8—Effect of PCS Based Primer on VHB Adhesive Tape Performance

The objective of this experiment was to test the performance of the PCS primer with a VHB tape adhesive. Aluminum Single-Lap-Joint Adhesively Bonded Metal Specimens (ASTM D1002) were used for testing. The PCS polymer was produced by Purdue Lab. A pure primer containing 0.1 wt/vol % of PCS in acetone was tested. Lap shear specimens with no primer and a 0.1% poly-styrene primer were utilized as the controls. All samples were bonded with VHB adhesive tape. This was done in dry, wet, and cold conditions. The forces required to bring each bond to failure were compared to enable determination of the effect of PCS on the bond strength.

60 aluminum metal samples (5 inch by 1 inch) were prepared by wiping with a Kimtech wipe and acetone. Two primer solutions were prepared. Details of the primers used are described below in Table 26.

TABLE 26

Primers of Example 8

| Formula ID | Formula Description | Preparation |
|---|---|---|
| F0002 | 0.1% Poly-Styrene (Acetone/Toluene) | Add 0.1 g PS to 100 ml (50/50 Acetone/Toluene) |
| F0012 | 0.1% PCS (25% Catechol) from Purdue Lab | to 1 ml of F0009, add 9 ml of Acetone |

The metal samples were primed by applying 0.1 ml of each primer solution to the aluminum lap shears. The solution was spread across the metal sample using a plastic pipette to evenly distribute across a 1" length segment on the end metal sample. The solvent evaporated, leaving a thin film on the metal surface. Once the samples were primed, the samples sat for 4 hours prior to bonding. For the dry condition, a 1" long segment of VHB tape adhesive was then applied to each one of the lap shears. The red film protecting the adhesive on the other side of the tape was removed, and the top lap shear was placed on top. The combined lap shear pair was squeezed together with the operator's hands, and the samples were not clamped. For the wet condition, the primed samples were placed on a sheet of brown paper. Then, a sprayer bottle filled with tap water was used to spray the samples 4-5 times from around 3 feet away. This simulates a wet or rainy condition. The VHB tape was then immediately applied, in the same way as with the dry condition. For the cold condition, the primed samples and VHB tape was placed inside of the laboratory refrigerator and allowed to cool down for 3 hours. Then, the VHB tape was immediately applied.

Note that because the tape is 0.75" wide, the overlap area for all samples was calculated using Overlap*0.75" instead of the regular 1.0". This resulted in an average overlap area of around 0.75 in2.

Figure 19:
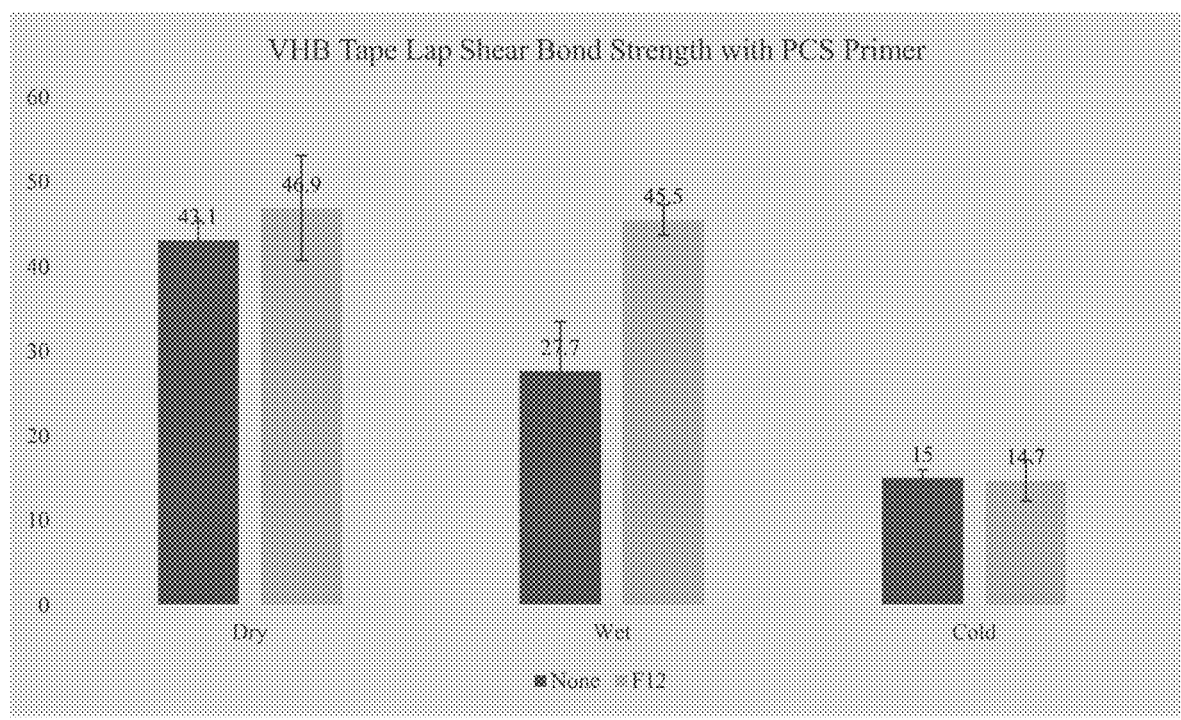
FIG. 19 depicts a bar graph of average bond strength for aluminum bonded in dry, wet, and cold conditions with VHB adhesive tape.

The samples were allowed to sit for 24 hours. Then, the 30 bonded samples were pulled with an Instron per ASTM D1002. The force (in lbs) required to break the bond was recorded. This force was converted to PSI by dividing by the overlap area, calculated as mentioned. The results are summarized in FIG. 19.

These results indicate that the PCS caused no significant change in either the dry or cold condition, but significantly conserved the performance of the VHB tape in the case of the wet condition. In the dry condition, the lap shears primed with F0012 performed slightly better than the unprimed lap shears, but the result is not significant as the standard deviations overlap. In the wet condition, the 0.1% PCS primer (F0012) allowed for bond strength to remain at the same strength as the dry condition. Meanwhile, the unprimed samples dropped in strength to 27.7 PSI. This means the PCS allows for an improvement of 64.4% over the unprimed wet condition. No significant improvement or depreciation was observed in the other conditions.

These experiments on VHB adhesive tape with 0.1% PCS primer on dry, wet, and cold conditions indicates that PCS primer can significantly conserve performance in a wet or rainy condition. The wet primed samples strongly outperformed the wet unprimed samples in bond strength. No significant performance improvement over the dry control was observed in any condition.

Example 9—Effect of PCS Based Primer on Flexcon PSA Tape Performance

The objective of this experiment was to test the performance of the PCS primer with the Flexcon PSA tape. The PCS polymer was produced by Purdue Lab. A pure primer containing 0.1 wt/vol % of PCS in acetone was tested. Aluminum lap shear specimens with no primer and a 0.1% poly-styrene primer were utilized as the controls. All samples were bonded with the Flexcon PSA tape. This was done in dry, wet, and cold conditions. The strength of the bond to the aluminum was measured via ASTM D903, 180 degree Peel Strip Strength of Adhesive Bonds. The forces required to peel the Flexcon PSA tape from the aluminum substrates were measured to enable determination of the effect of PCS on bond strength.

45 aluminum metal samples (5 inch by 1 inch) were prepared by wiping with a Kimtech wipe and acetone. Two primer solutions were prepared. Details of the primers used are described below in Table 27.

TABLE 27

Primers of Example 9

| Formula ID | Formula Description | Preparation |
|---|---|---|
| F0002 | 0.1% Poly-Styrene (Acetone/Toluene) | Add 0.1 g PS to 100 ml (50/50 Acetone/Toluene) |
| F0012 | 0.1% PCS (25% Catechol) from Purdue Lab | to 1 ml of 1% wt. PCS in Acetone solution, add 9 ml of Acetone |

The aluminum lap shears were primed by applying 0.5 ml of each primer solution to each via micropipette. The solution was spread across the metal sample using the plastic micropipette tip to evenly distribute across the entire length of the metal lap shear, therefore covering five square inches. The solvent evaporated, leaving a thin film on the metal surface. Once the samples were primed, the samples sat for 4 hours prior to bonding. The bonding of the Flexcon tape was performed in the following way: strips one inch wide and around 10 inches long were cut in preparation, and the protective film was removed before placing it on the entirety of the lap shear, leaving around 5 inches hanging off. The strips were applied on the dry condition. For the wet condition, the samples were placed on a sheet of brown paper. Then, a sprayer bottle filled with tap water was used to spray the samples 4-5 times from around 3 feet away. This simulates a wet or rainy condition. The Flexcon tape was then immediately applied via the same procedure as the dry condition. For the cold condition, the lap shears and the Flexcon tape was placed inside of the laboratory refrigerator and allowed to cool down for 3 hours. Then, the tape was immediately applied. For all conditions, the flat end of a sharpie was used to evenly apply pressure to the tape once it was stuck to the metal lap shear.

Figure 20:
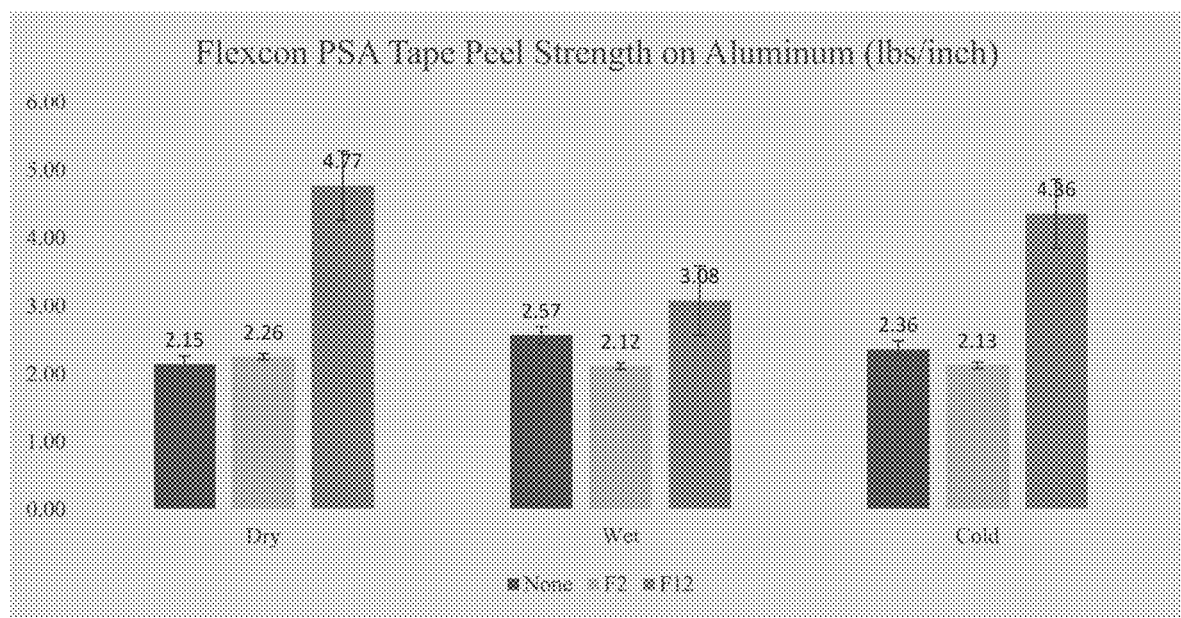
FIG. 20 depicts a bar graph of average bond strength for aluminum bonded in dry, wet, and cold conditions with Flexcon tape.

The samples were allowed to sit for 24 hours. Then, the 45 bonded samples were pulled with an Instron per ASTM D903, 180 degree Peel Strip Strength of Adhesive Bonds. The force (in lbs) required to peel the tape from the aluminum was recorded. Via the peel test method in Testworks, this was converted to Scatter Peel and Peel Strength. The results are summarized in FIG. 20.

These results indicate that the primer F12 led to statistically significant improvement in performance in dry and cold conditions. There was an improvement in the wet condition, but it may or not be significant. From these results the percent improvement over the control can be calculated, as summarized below in Table 28.

TABLE 28

| Percent Improvement of F12 | | | |
|---|---|---|---|
| Primer | Dry | Wet | Cold |
| F0012 | 122 | 20 | 84 |

F0012 led to the largest improvement, 122%, for the dry condition, more than doubling the peel strength. In the cold condition, the strength was increased by 84%. For the wet condition, the strength was increased by 20% but it may not be statistically significant due to the variability in the results. In all conditions, the poly-styrene control performed the same or worse as the no-primer control. It is also worthy to note that the samples primed with F0012 displayed far larger variability in their results than None or F002. However, the F0012 samples still outperformed the other conditions in all cases.

These experiments on Flexcon adhesive tape with 0.1% PCS primer on dry, wet, and cold conditions indicates that PCS primer can significantly improve performance the tape's performance in dry and cold conditions.

What is claimed:

1. A polymeric layer comprising catechol containing polymer or oligomer, wherein
said catechol presents as a catechol and/or as a semi-quinone and/or as a quinone, each without the presence of a primary amine or a secondary amine; and wherein the polymeric layer comprises at least one of: a) a reactive species separate from the catechol containing polymer or oligomer; and b) a catalyst, co-catalyst or an accelerator.

2. The polymeric layer of claim 1, wherein the polymeric layer comprises the reactive species separate from the catechol containing polymer or oligomer; and the reactive species is a urethane component, an epoxy resin, an acrylate monomer or oligomer, a methacrylate monomer or oligomer, a silane, or a combination thereof.

3. The polymeric layer of claim 2, wherein the reactive species is a urethane component that is a polyol or an organic compound containing multiple hydroxyl groups; and wherein the urethane is linear or branched; and optionally, wherein the urethane component is 1,6-hexanediol, glycerol, a modified polyester polyol, or polycaprolactone triol.

4. The polymeric layer of claim 2, wherein the reactive species is an epoxy resin that is an epoxy monomer, an epoxy oligomer, a polyepoxide or combinations thereof; and wherein the epoxy is linear or branched; and optionally, wherein the epoxy resin is bisphenol A diglycidyl ether, Bisphenol A epoxy resin, bis(4-glycidyloxyphenyl)methane, bisphenol E diglycidyl ether (DGEBE), 2,2'-[1,1-Ethanediylbis(4,1-phenyleneoxymethylene)] dioxirane, bisphenol F diglycidyl ether (DGEBF), poly(bisphenol A-co-epichlorohydrin) or combinations thereof.

5. The polymeric layer of claim 2, wherein the reactive species is an acrylate monomer or oligomer that is an acrylate monomer comprising a vinyl group and at least one of a carboxylic acid ester and a carboxylic acid nitrile; and wherein the acrylate is linear or branched; and optionally, wherein the acrylate monomer or oligomer is ethyl acrylate, ethylene-methyl acrylate, methyl methacrylate, 2-chloroethyl vinyl ether, 2-hydroxyethyl acrylate, hydroxyethyl methacrylate, butyl acrylate, trimethylolpropane triacrylate (TMPTA) or combinations thereof.

6. The polymeric layer of claim 1, wherein the polymeric layer comprises the catalyst, co-catalyst or accelerator; and the catalyst, co-catalyst or accelerator is a urethane catalyst that promotes a urethane polymerization reaction, an epoxy catalyst that promotes an epoxy polymerization reaction, an acrylate catalyst that promotes an acrylate polymerization reaction, or combinations thereof.

7. The polymeric layer of claim 6, wherein the catalyst, co-catalyst or accelerator is a urethane catalyst that promotes a urethane polymerization reaction; and
    wherein the urethane catalyst is 1,4-diazabicyclo[2.2.2]octane, a zirconium chelate, benzyldimethylamine or combinations thereof; or
    wherein the catalyst, co-catalyst or accelerator is an epoxy catalyst that promotes epoxy polymerization; and wherein the epoxy catalyst is 1,4-diazabicyclo[2.2.2]octane; or
    wherein the catalyst, co-catalyst or accelerator is an acrylate catalyst that promotes acrylate polymerization; and wherein the acrylate catalyst is an acrylic or a free-radical polymerization promoter.

8. The polymeric layer of claim 1, wherein the polymeric layer has a thickness of from about 10 nanometers to about 100 microns; or a thickness of from about 15 nanometers to about 50 microns; or a thickness of from about 15 nanometers to about 15 microns; or a thickness of from about 150 nanometers to less than about 15 microns; or a thickness of from about 150 nanometers to about 1.5 microns.

9. The polymeric layer of claim 1, wherein the catechol containing polymer or oligomer comprises poly-catechol styrene (PCS) comprising from about 25% by weight catechol to about 35% by weight catechol.

10. The polymeric layer of claim 9, wherein the PCS comprises about 25% by weight catechol; or about 35% by weight catechol.

11. A substrate comprising the polymeric layer of claim 1 disposed on a surface of the substrate; wherein the substrate comprises a plastic, a metal, a mineral, a composite, a glass, a silane, concrete, a ceramic, wood, reconstituted wood, asphalt, pitch, tar, bitumen, paper, fused materials or agglomerated materials; and
    wherein the substrate is wet, dry, semi-wet or moist.

12. The substrate of claim 11, wherein the substrate comprises aluminum or steel.

13. A polymer matrix in contact with the polymeric layer of claim 1; wherein the polymer matrix is a bulk adhesive, a sealant, a coating, an ink, a pressure-sensitive adhesive (PSA), a composite or a film.

14. The polymer matrix of claim 13, wherein the polymer matrix is a bulk adhesive.

15. A method of making a substrate comprising disposing the polymeric layer of claim 1 on a surface of the substrate; wherein the substrate comprises a plastic, a metal, a mineral, a composite, a glass, a silane, concrete, a ceramic, wood, reconstituted wood, asphalt, pitch, tar, bitumen, paper, fused materials or agglomerated materials; and
    wherein the substrate is wet, dry, semi-wet or moist.

16. The method of claim 15, wherein the substrate comprises aluminum or steel.

17. The method of claim 15, wherein the disposing comprises disposing in a dry environment.

18. The method of claim 17, wherein the dry environment is an ambient environment that is humid.

19. The method of claim 15, wherein the disposing comprises disposing in an aqueous environment.

20. The method of claim 19, wherein the aqueous environment is an underwater environment.

21. The method of claim 15, further comprising disposing a polymer matrix on the polymeric layer; wherein the polymer matrix is a bulk adhesive, a sealant, a coating, an ink, a pressure-sensitive adhesive (PSA), a composite or a film.

22. The method of claim 21, wherein the polymer matrix is a bulk adhesive.

23. The method of claim 21, wherein the disposing comprises disposing in a dry environment.

24. The method of claim 23, wherein the dry environment is an ambient environment that is humid.

25. The method of claim 21, wherein the disposing comprises disposing in an aqueous environment.

26. The method of claim 25, wherein the aqueous environment is an underwater environment.

27. A layered structure comprising the polymeric layer of claim 1 disposed between a substrate and a polymer matrix.

28. An article comprising the polymeric layer of claim 1.

* * * * *